United States Patent
Qin

(10) Patent No.: US 11,059,920 B2
(45) Date of Patent: Jul. 13, 2021

(54) PROCESS FOR PRODUCING HIGH CIS-1,4-POLYDIENE WITH LANTHANIDE-BASED CATALYST COMPOSITIONS

(71) Applicant: Bridgestone Corporation, Chuo-ku (JP)

(72) Inventor: Zengquan Qin, Nashville, TN (US)

(73) Assignee: Bridgestone Corporation, Chuo-ku (JP)

( * ) Notice: Subject to any disclaimer, the term of this patent is extended or adjusted under 35 U.S.C. 154(b) by 187 days.

(21) Appl. No.: 16/321,329

(22) PCT Filed: Jul. 28, 2017

(86) PCT No.: PCT/US2017/044373
§ 371 (c)(1),
(2) Date: Jan. 28, 2019

(87) PCT Pub. No.: WO2018/022994
PCT Pub. Date: Feb. 1, 2018

(65) Prior Publication Data
US 2019/0169330 A1    Jun. 6, 2019

Related U.S. Application Data

(60) Provisional application No. 62/368,384, filed on Jul. 29, 2016.

(51) Int. Cl.
| | |
|---|---|
| *C08F 36/06* | (2006.01) |
| *C08F 4/52* | (2006.01) |
| *C08F 4/44* | (2006.01) |
| *C08F 136/06* | (2006.01) |
| *C08F 4/54* | (2006.01) |
| *C08F 236/06* | (2006.01) |

(52) U.S. Cl.
CPC ............ *C08F 136/06* (2013.01); *C08F 4/545* (2013.01); *C08F 36/06* (2013.01); *C08F 4/52* (2013.01); *C08F 236/06* (2013.01); *C08F 2410/01* (2013.01)

(58) Field of Classification Search
CPC ...... C08F 36/06; C08F 136/06; C08F 236/06; C08F 4/545; C08F 4/52
See application file for complete search history.

(56) References Cited

U.S. PATENT DOCUMENTS

| | | | |
|---|---|---|---|
| 8,765,887 B2 * | 7/2014 | Luo | ........................ C08F 4/545 526/164 |
| 2009/0292043 A1 | 11/2009 | Kurazumi et al. | |
| 2012/0165484 A1 | 6/2012 | Luo | |
| 2012/0309906 A1 | 12/2012 | Hogan et al. | |
| 2015/0183904 A1 | 7/2015 | Tamaki et al. | |

FOREIGN PATENT DOCUMENTS

| | | |
|---|---|---|
| CN | 101906110 A | 12/2010 |
| JP | 2013216850 A | 10/2013 |

OTHER PUBLICATIONS

International Search Report and Written Opinion, dated Nov. 20, 2017, International Application PCT/US2017/044373.
Office Action dated Oct. 13, 2020 in corresponding Chinese application No. 201780056343.1 (10 pps.) English translation not available; above CN 101906110 is listed as an "A" reference.

* cited by examiner

*Primary Examiner* — Rip A Lee
(74) *Attorney, Agent, or Firm* — Meredith E. Hooker; Arthur M. Reginelli

(57) ABSTRACT

A method for producing a polydiene, the method comprising the step of: polymerizing conjugated diene monomer with a lanthanide-based catalyst system in the presence of a hydrocarbyloxysilane.

18 Claims, No Drawings

PROCESS FOR PRODUCING HIGH CIS-1,4-POLYDIENE WITH LANTHANIDE-BASED CATALYST COMPOSITIONS

This application is a National-Stage application of PCT/US2017/044373 filed on Jul. 28, 2017, which claims the benefit of U.S. Provisional Application Ser. No. 62/368,384 filed on Jul. 29, 2016, which are incorporated herein by reference.

FIELD OF THE INVENTION

Embodiments of the present invention relate to processes for producing polydienes, as well as lanthanide-based catalyst systems that are useful in polydiene production processes.

BACKGROUND OF THE INVENTION

Catalyst systems comprising lanthanide compounds are known to be useful for polymerizing conjugated dienes. These catalyst systems can be stereospecific and, to some extent, can selectively produce cis-1,4-polydienes or trans-1,4-polydienes, depending on the specific catalyst system. For example, a catalyst system including a lanthanide-containing compound, an alkylating agent, and a halogen-containing compound can be useful in producing cis-1,4-polydienes from various conjugated diene monomers. These catalyst systems are also capable of copolymerizing different types of conjugated diene monomers to give stereoregular cis-1,4-copolydienes.

Cis-1,4-polydienes produced by lanthanide-based catalyst systems have a linear backbone structure and exhibit good green strength and excellent viscoelastic properties. The linear backbone structure is believed to contribute to useful cured rubber properties such as improved tensile, abrasion and fatigue resistance, and low hysteresis loss. These polydienes are therefore particularly suited for use in tire components, such as the sidewalls and treads. Despite advances, however, catalyst systems to produce improved polydienes are still desired.

SUMMARY OF THE INVENTION

One or more embodiments of the present invention provide a method for producing a polydiene, the method comprising the step of: polymerizing conjugated diene monomer with a lanthanide-based catalyst system in the presence of a hydrocarbyloxysilane.

Other embodiments of the present invention provide a method for producing a polydiene, the method comprising the steps of: (i) forming an active catalyst by combining a lanthanide-containing compound, an alkylating agent, and a halogen source; and (ii) polymerizing conjugated diene monomer in the presence of the active catalyst and a hydrocarbyloxysilane compound.

DETAILED DESCRIPTION OF ILLUSTRATIVE EMBODIMENTS

Embodiments of this invention are based, at least in part, on the discovery of a process for producing high cis-1,4-polydienes that includes polymerizing conjugated dienes with a lanthanide-based catalyst in the presence of a hydrocarbyloxysilane. The presence of the hydrocarbyloxysilane has been found to advantageously increase the cis-1,4- linkage content of the resulting polydiene as compared to polydienes produced in the absence of the hydrocarbyloxysilane. Also, the presence of the hydrocarbyloxysilane during polymerization produces polymers characterized by a relatively high percentage of chain ends possessing a reactive end.

The lanthanide-based catalyst system used in conjunction with the hydrocarbyloxysilane is not necessarily limited to the selection of any particular lanthanide-based catalyst system. In one or more embodiments, the catalyst systems employed include (a) a lanthanide-containing compound, (b) an alkylating agent, and (c) a halogen source. In other embodiments, a compound containing a non-coordinating anion or a non-coordinating anion precursor can be employed in lieu of a halogen source. In these or other embodiments, other organometallic compounds, Lewis bases, and/or polymerization modifiers can be employed in addition to the ingredients or components set forth above. For example, in one embodiment, a nickel-containing compound can be employed as a molecular weight regulator as disclosed in U.S. Pat. No. 6,699,813, which is incorporated herein by reference. Also, polymerization modulators may be used such as dihydrocarbyl ethers, as disclosed in U.S. Pat. No. 7,741,418, or amines, as disclosed in International App. No. PCT/US2011/051717, which are incorporated herein by reference.

Examples of conjugated diene monomer include 1,3 butadiene, isoprene, 1,3 pentadiene, 1,3 hexadiene, 2,3 dimethyl 1,3 butadiene, 2 ethyl 1,3 butadiene, 2 methyl 1,3 pentadiene, 3 methyl 1,3 pentadiene, 4 methyl-1,3 pentadiene, and 2,4 hexadiene. Mixtures of two or more conjugated dienes may also be utilized in copolymerization.

As mentioned above, the catalyst systems of the present invention can include at least one lanthanide-containing compound. Lanthanide-containing compounds useful in the present invention are those compounds that include at least one atom of lanthanum, neodymium, cerium, praseodymium, promethium, samarium, europium, gadolinium, terbium, dysprosium, holmium, erbium, thulium, ytterbium, lutetium, and didymium. In one embodiment, these compounds can include neodymium, lanthanum, samarium, or didymium. As used herein, the term "didymium" shall denote a commercial mixture of rare-earth elements obtained from monazite sand. In addition, the lanthanide-containing compounds useful in the present invention can be in the form of elemental lanthanide.

The lanthanide atom in the lanthanide-containing compounds can be in various oxidation states including, but not limited to, the 0, +2, +3, and +4 oxidation states. In one embodiment, a trivalent lanthanide-containing compound, where the lanthanide atom is in the +3 oxidation state, can be employed. Suitable lanthanide-containing compounds include, but are not limited to, lanthanide carboxylates, lanthanide organophosphates, lanthanide organophosphonates, lanthanide organophosphinates, lanthanide carbamates, lanthanide dithiocarbamates, lanthanide xanthates, lanthanide β-diketonates, lanthanide alkoxides or aryloxides, lanthanide halides, lanthanide pseudo-halides, lanthanide oxyhalides, and organolanthanide compounds.

In one or more embodiments, the lanthanide-containing compounds can be soluble in hydrocarbon solvents such as aromatic hydrocarbons, aliphatic hydrocarbons, or cycloaliphatic hydrocarbons. Hydrocarbon-insoluble lanthanide-containing compounds, however, may also be useful in the present invention, as they can be suspended in the polymerization medium to form the catalytically active species.

For ease of illustration, further discussion of useful lanthanide-containing compounds will focus on neodymium compounds, although those skilled in the art will be able to select similar compounds that are based upon other lanthanide metals.

Suitable neodymium carboxylates include, but are not limited to, neodymium formate, neodymium acetate, neodymium acrylate, neodymium methacrylate, neodymium valerate, neodymium gluconate, neodymium citrate, neodymium fumarate, neodymium lactate, neodymium maleate, neodymium oxalate, neodymium 2-ethylhexanoate, neodymium neodecanoate (a.k.a., neodymium versatate), neodymium naphthenate, neodymium stearate, neodymium oleate, neodymium benzoate, and neodymium picolinate.

Suitable neodymium organophosphates include, but are not limited to, neodymium dibutyl phosphate, neodymium dipentyl phosphate, neodymium dihexyl phosphate, neodymium diheptyl phosphate, neodymium dioctyl phosphate, neodymium bis(1-methylheptyl) phosphate, neodymium bis(2-ethylhexyl) phosphate, neodymium didecyl phosphate, neodymium didodecyl phosphate, neodymium dioctadecyl phosphate, neodymium dioleyl phosphate, neodymium diphenyl phosphate, neodymium bis(p-nonylphenyl) phosphate, neodymium butyl (2-ethylhexyl) phosphate, neodymium (1-methylheptyl) (2-ethylhexyl) phosphate, and neodymium (2-ethylhexyl) (p-nonylphenyl) phosphate.

Suitable neodymium organophosphonates include, but are not limited to, neodymium butyl phosphonate, neodymium pentyl phosphonate, neodymium hexyl phosphonate, neodymium heptyl phosphonate, neodymium octyl phosphonate, neodymium (1-methylheptyl) phosphonate, neodymium (2-ethylhexyl) phosphonate, neodymium decyl phosphonate, neodymium dodecyl phosphonate, neodymium octadecyl phosphonate, neodymium oleyl phosphonate, neodymium phenyl phosphonate, neodymium (p-nonylphenyl) phosphonate, neodymium butyl butylphosphonate, neodymium pentyl pentylphosphonate, neodymium hexyl hexylphosphonate, neodymium heptyl heptylphosphonate, neodymium octyl octylphosphonate, neodymium (1-methylheptyl) (1-methylheptyl)phosphonate, neodymium (2-ethylhexyl) (2-ethylhexyl)phosphonate, neodymium decyl decylphosphonate, neodymium dodecyl dodecylphosphonate, neodymium octadecyl octadecylphosphonate, neodymium oleyl oleylphosphonate, neodymium phenyl phenylphosphonate, neodymium (p-nonylphenyl) (p-nonylphenyl)phosphonate, neodymium butyl (2-ethylhexyl)phosphonate, neodymium (2-ethylhexyl) butylphosphonate, neodymium (1-methylheptyl) (2-ethylhexyl)phosphonate, neodymium (2-ethylhexyl) (1-methylheptyl)phosphonate, neodymium (2-ethylhexyl) (p-nonylphenyl)phosphonate, and neodymium (p-nonylphenyl) (2-ethylhexyl)phosphonate.

Suitable neodymium organophosphinates include, but are not limited to, neodymium butylphosphinate, neodymium pentylphosphinate, neodymium hexylphosphinate, neodymium heptylphosphinate, neodymium octylphosphinate, neodymium (1-methylheptyl)phosphinate, neodymium (2-ethylhexyl)phosphinate, neodymium decylphosphinate, neodymium dodecylphosphinate, neodymium octadecylphosphinate, neodymium oleylphosphinate, neodymium phenylphosphinate, neodymium (p-nonylphenyl) phosphinate, neodymium dibutylphosphinate, neodymium dipentylphosphinate, neodymium dihexylphosphinate, neodymium diheptylphosphinate, neodymium dioctylphosphinate, neodymium bis(1-methylheptyl)phosphinate, neodymium bis(2-ethylhexyl)phosphinate, neodymium didecylphosphinate, neodymium didodecylphosphinate, neodymium dioctadecylphosphinate, neodymium dioleylphosphinate, neodymium diphenylphosphinate, neodymium bis(p-nonylphenyl) phosphinate, neodymium butyl (2-ethylhexyl) phosphinate, neodymium (1-methylheptyl) (2-ethylhexyl)phosphinate, and neodymium (2-ethylhexyl) (p-nonylphenyl)phosphinate.

Suitable neodymium carbamates include, but are not limited to, neodymium dimethylcarbamate, neodymium diethylcarbamate, neodymium diisopropylcarbamate, neodymium dibutylcarbamate, and neodymium dibenzylcarbamate.

Suitable neodymium dithiocarbamates include, but are not limited to, neodymium dimethyldithiocarbamate, neodymium diethyldithiocarbamate, neodymium diisopropyldithiocarbamate, neodymium dibutyldithiocarbamate, and neodymium dibenzyldithiocarbamate.

Suitable neodymium xanthates include, but are not limited to, neodymium methylxanthate, neodymium ethylxanthate, neodymium isopropylxanthate, neodymium butylxanthate, and neodymium benzylxanthate.

Suitable neodymium β-diketonates include, but are not limited to, neodymium acetylacetonate, neodymium trifluoroacetylacetonate, neodymium hexafluoroacetylacetonate, neodymium benzoylacetonate, and neodymium 2,2,6,6-tetramethyl-3,5-heptanedionate.

Suitable neodymium alkoxides or aryloxides include, but are not limited to, neodymium methoxide, neodymium ethoxide, neodymium isopropoxide, neodymium 2-ethylhexoxide, neodymium phenoxide, neodymium nonylphenoxide, and neodymium naphthoxide.

Suitable neodymium halides include, but are not limited to, neodymium fluoride, neodymium chloride, neodymium bromide, and neodymium iodide. Suitable neodymium pseudo-halides include, but are not limited to, neodymium cyanide, neodymium cyanate, neodymium thiocyanate, neodymium azide, and neodymium ferrocyanide. Suitable neodymium oxyhalides include, but are not limited to, neodymium oxyfluoride, neodymium oxychloride, and neodymium oxybromide. A Lewis base, such as tetrahydrofuran ("THF"), may be employed as an aid for solubilizing this class of neodymium compounds in inert organic solvents. Where lanthanide halides, lanthanide oxyhalides, or other lanthanide-containing compounds containing a halogen atom are employed, the lanthanide-containing compound may also serve as all or part of the halogen source in the above-mentioned catalyst system.

As used herein, the term "organolanthanide compound" refers to any lanthanide-containing compound containing at least one lanthanide-carbon bond. These compounds are predominantly, though not exclusively, those containing cyclopentadienyl ("Cp"), substituted cyclopentadienyl, allyl, and substituted allyl ligands. Suitable organolanthanide compounds include, but are not limited to, $Cp_3Ln$, $Cp_2LnR$, $Cp_2LnCl$, $CpLnCl_2$, CpLn (cyclooctatetraene), $(C_5Me_5)_2LnR$, $LnR_3$, $Ln(allyl)_3$, and $Ln(allyl)_2Cl$, where Ln represents a lanthanide atom, and R represents a hydrocarbyl group. In one or more embodiments, hydrocarbyl groups useful in the present invention may contain heteroatoms such as, for example, nitrogen, oxygen, boron, silicon, sulfur, and phosphorus atoms.

As mentioned above, the catalyst systems employed in the present invention can include an alkylating agent. In one or more embodiments, alkylating agents, which may also be referred to as hydrocarbylating agents, include organometallic compounds that can transfer one or more hydrocarbyl groups to another metal. Typically, these agents include organometallic compounds of electropositive metals such as those from Groups 1, 2, and 13 metals under IUPAC numbering (Groups IA, IIA, and IIIA metals). Alkylating agents useful in the present invention include, but are not limited to, organoaluminum and organomagnesium compounds. As used herein, the term "organoaluminum compound" refers to any aluminum compound containing at least one aluminum-carbon bond. In one or more embodiments, organoaluminum compounds that are soluble in a hydrocarbon solvent can be employed. As used herein, the term "organomagnesium compound" refers to any magnesium compound that contains at least one magnesium-carbon bond. In one or more embodiments, organomagnesium compounds that are soluble in a hydrocarbon can be employed. As will be described in more detail below, several species of suitable alkylating agents can be in the form of a halide. Where the alkylating agent includes a halogen atom, the alkylating agent may also serve as all or part of the halogen source in the above-mentioned catalyst system.

In one or more embodiments, organoaluminum compounds that can be utilized include those represented by the general formula $AlR_nX_{3-n}$, where each R independently can be a monovalent organic group that is attached to the aluminum atom via a carbon atom, where each X independently can be a hydrogen atom, a halogen atom, a carboxylate group, an alkoxide group, or an aryloxide group, and where n can be an integer in the range of from 1 to 3. Where the organoaluminum compound includes a halogen atom, the organoaluminum compound can serve as both the alkylating agent and at least a portion of the halogen source in the catalyst system. In one or more embodiments, each R independently can be a hydrocarbyl group such as, for example, alkyl, cycloalkyl, substituted cycloalkyl, alkenyl, cycloalkenyl, substituted cycloalkenyl, aryl, substituted aryl, aralkyl, alkaryl, allyl, and alkynyl groups, with each group containing in the range of from 1 carbon atom, or the appropriate minimum number of carbon atoms to form the group, up to about 20 carbon atoms. These hydrocarbyl groups may contain heteroatoms including, but not limited to, nitrogen, oxygen, boron, silicon, sulfur, and phosphorus atoms.

Types of the organoaluminum compounds that are represented by the general formula $AlR_nX_{3-n}$ include, but are not limited to, trihydrocarbylaluminum, dihydrocarbylaluminum hydride, hydrocarbylaluminum dihydride, dihydrocarbylaluminum carboxylate, hydrocarbylaluminum bis(carboxylate), dihydrocarbylaluminum alkoxide, hydrocarbylaluminum dialkoxide, dihydrocarbylaluminum halide, hydrocarbylaluminum dihalide, dihydrocarbylaluminum aryloxide, and hydrocarbylaluminum diaryloxide compounds. In one embodiment, the alkylating agent can comprise trihydrocarbylaluminum, dihydrocarbylaluminum hydride, and/or hydrocarbylaluminum dihydride compounds. In one embodiment, when the alkylating agent includes an organoaluminum hydride compound, the above-mentioned halogen source can be provided by a tin halide, as disclosed in U.S. Pat. No. 7,008,899, which is incorporated herein by reference in its entirety.

Suitable trihydrocarbylaluminum compounds include, but are not limited to, trimethylaluminum, triethylaluminum, triisobutylaluminum, tri-n-propylaluminum, triisopropylaluminum, tri-n-butylaluminum, tri-t-butylaluminum, tri-n-pentylaluminum, trineopentylaluminum, tri-n-hexylaluminum, tri-n-octylaluminum, tris(2-ethylhexyl)aluminum, tricyclohexylaluminum, tris(1-methylcyclopentyl)aluminum, triphenylaluminum, tri-p-tolylaluminum, tris(2,6-dimethylphenyl)aluminum, tribenzylaluminum, diethylphenylaluminum, diethyl-p-tolylaluminum, diethylbenzylaluminum, ethyldiphenylaluminum, ethyldi-p-tolylaluminum, and ethyldibenzylaluminum.

Suitable dihydrocarbylaluminum hydride compounds include, but are not limited to, diethylaluminum hydride, di-n-propylaluminum hydride, diisopropylaluminum hydride, di-n-butylaluminum hydride, diisobutylaluminum hydride, di-n-octylaluminum hydride, diphenylaluminum hydride, di-p-tolylaluminum hydride, dibenzylaluminum hydride, phenylethylaluminum hydride, phenyl-n-propylaluminum hydride, phenylisopropylaluminum hydride, phenyl-n-butylaluminum hydride, phenylisobutylaluminum hydride, phenyl-n-octylaluminum hydride, p-tolylethylaluminum hydride, p-tolyl-n-propylaluminum hydride, p-tolylisopropylaluminum hydride, p-tolyl-n-butylaluminum hydride, p-tolylisobutylaluminum hydride, p-tolyl-n-octylaluminum hydride, benzylethylaluminum hydride, benzyl-n-propylaluminum hydride, benzylisopropylaluminum hydride, benzyl-n-butylaluminum hydride, benzylisobutylaluminum hydride, and benzyl-n-octylaluminum hydride.

Suitable hydrocarbylaluminum dihydrides include, but are not limited to, ethylaluminum dihydride, n-propylaluminum dihydride, isopropylaluminum dihydride, n-butylaluminum dihydride, isobutylaluminum dihydride, and n-octylaluminum dihydride.

Suitable dihydrocarbylaluminum halide compounds include, but are not limited to, diethylaluminum chloride, di-n-propylaluminum chloride, diisopropylaluminum chloride, di-n-butylaluminum chloride, diisobutylaluminum chloride, di-n-octylaluminum chloride, diphenylaluminum chloride, di-p-tolylaluminum chloride, dibenzylaluminum chloride, phenylethylaluminum chloride, phenyl-n-propylaluminum chloride, phenylisopropylaluminum chloride, phenyl-n-butylaluminum chloride, phenylisobutylaluminum chloride, phenyl-n-octylaluminum chloride, p-tolylethylaluminum chloride, p-tolyl-n-propylaluminum chloride, p-tolylisopropylaluminum chloride, p-tolyl-n-butylaluminum chloride, p-tolylisobutylaluminum chloride, p-tolyl-n-octylaluminum chloride, benzylethylaluminum chloride, benzyl-n-propylaluminum chloride, benzylisopropylaluminum chloride, benzyl-n-butylaluminum chloride, benzylisobutylaluminum chloride, and benzyl-n-octylaluminum chloride.

Suitable hydrocarbylaluminum dihalide compounds include, but are not limited to, ethylaluminum dichloride, n-propylaluminum dichloride, isopropylaluminum dichloride, n-butylaluminum dichloride, isobutylaluminum dichloride, and n-octylaluminum dichloride.

Other organoaluminum compounds useful as alkylating agents that may be represented by the general formula $AlR_nX_{3-n}$ include, but are not limited to, dimethylaluminum hexanoate, diethylaluminum octoate, diisobutylaluminum 2-ethylhexanoate, dimethylaluminum neodecanoate, diethylaluminum stearate, diisobutylaluminum oleate, methylaluminum bis(hexanoate), ethylaluminum bis(octoate), isobutylaluminum bis(2-ethylhexanoate), methylaluminum bis(neodecanoate), ethylaluminum bis(stearate), isobutylaluminum bis(oleate), dimethylaluminum methoxide, diethylaluminum methoxide, diisobutylaluminum methoxide, dimethylaluminum ethoxide, diethylaluminum ethoxide, diisobutylaluminum ethoxide, dimethylaluminum phenoxide, diethylaluminum phenoxide, diisobutylaluminum phenoxide, methylaluminum dimethoxide, ethylaluminum dimethoxide, isobutylaluminum dimethoxide, methylaluminum diethoxide, ethylaluminum diethoxide, isobutylaluminum diethoxide, methylaluminum diphenoxide, ethylaluminum diphenoxide, and isobutylaluminum diphenoxide.

Another class of organoaluminum compounds suitable for use as an alkylating agent in the present invention is aluminoxanes. Aluminoxanes can comprise oligomeric linear aluminoxanes, which can be represented by the general formula:

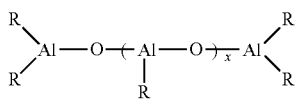

and oligomeric cyclic aluminoxanes, which can be represented by the general formula:

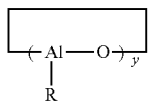

where x can be an integer in the range of from 1 to about 100, or about 10 to about 50; y can be an integer in the range of from 2 to about 100, or about 3 to about 20; and where each R independently can be a monovalent organic group that is attached to the aluminum atom via a carbon atom. In one embodiment, each R independently can be a hydrocarbyl group including, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl groups, with each group containing in the range of from 1 carbon atom, or the appropriate minimum number of carbon atoms to form the group, up to about 20 carbon atoms. These hydrocarbyl groups may also contain heteroatoms including, but not limited to, nitrogen, oxygen, boron, silicon, sulfur, and phosphorus atoms. It should be noted that the number of moles of the aluminoxane as used in this application refers to the number of moles of the aluminum atoms rather than the number of moles of the oligomeric aluminoxane molecules. This convention is commonly employed in the art of catalyst systems utilizing aluminoxanes.

Aluminoxanes can be prepared by reacting trihydrocarbylaluminum compounds with water. This reaction can be performed according to known methods, such as, for example, (1) a method in which the trihydrocarbylaluminum compound is dissolved in an organic solvent and then contacted with water, (2) a method in which the trihydrocarbylaluminum compound is reacted with water of crystallization contained in, for example, metal salts, or water adsorbed in inorganic or organic compounds, or (3) a method in which the trihydrocarbylaluminum compound is reacted with water in the presence of the monomer or monomer solution that is to be polymerized.

Suitable aluminoxane compounds include, but are not limited to, methylaluminoxane ("MAO"), modified methylaluminoxane ("MMAO"), ethylaluminoxane, n-propylaluminoxane, isopropylaluminoxane, butylaluminoxane, isobutylaluminoxane, n-pentylaluminoxane, neopentylaluminoxane, n-hexylaluminoxane, n-octylaluminoxane, 2-ethylhexylaluminoxane, cyclohexylaluminoxane, 1-methylcyclopentylaluminoxane, phenylaluminoxane, and 2,6-dimethylphenylaluminoxane. Modified methylaluminoxane can be formed by substituting about 20 to 80 percent of the methyl groups of methylaluminoxane with $C_2$ to $C_{12}$ hydrocarbyl groups, preferably with isobutyl groups, by using techniques known to those skilled in the art.

Aluminoxanes can be used alone or in combination with other organoaluminum compounds. In one embodiment, methylaluminoxane and at least one other organoaluminum compound (e.g., $AlR_nX_{3-n}$), such as diisobutyl aluminum hydride, can be employed in combination. U.S. Publication No. 2008/0182954, which is incorporated herein by reference in its entirety, provides other examples where aluminoxanes and organoaluminum compounds can be employed in combination.

As mentioned above, alkylating agents useful in the present invention can comprise organomagnesium compounds. In one or more embodiments, organomagnesium compounds that can be utilized include those represented by the general formula $MgR_2$, where each R independently can be a monovalent organic group that is attached to the magnesium atom via a carbon atom. In one or more embodiments, each R independently can be a hydrocarbyl group including, but not limited to, alkyl, cycloalkyl, substituted cycloalkyl, alkenyl, cycloalkenyl, substituted cycloalkenyl, aryl, allyl, substituted aryl, aralkyl, alkaryl, and alkynyl groups, with each group containing in the range of from 1 carbon atom, or the appropriate minimum number of carbon atoms to form the group, up to about 20 carbon atoms. These hydrocarbyl groups may also contain heteroatoms including, but not limited to, nitrogen, oxygen, silicon, sulfur, and phosphorus atoms.

Suitable organomagnesium compounds that may be represented by the general formula $MgR_2$ include, but are not limited to, diethylmagnesium, di-n-propylmagnesium, diisopropylmagnesium, dibutylmagnesium, dihexylmagnesium, diphenylmagnesium, and dibenzylmagnesium.

Another class of organomagnesium compounds that can be utilized as an alkylating agent may be represented by the general formula RMgX, where R can be a monovalent organic group that is attached to the magnesium atom via a carbon atom, and X can be a hydrogen atom, a halogen atom, a carboxylate group, an alkoxide group, or an aryloxide group. Where the organomagnesium compound includes a halogen atom, the organomagnesium compound can serve as both the alkylating agent and at least a portion of the halogen source in the catalyst systems. In one or more embodiments, R can be a hydrocarbyl group including, but not limited to, alkyl, cycloalkyl, substituted cycloalkyl, alkenyl, cycloalkenyl, substituted cycloalkenyl, aryl, allyl, substituted aryl, aralkyl, alkaryl, and alkynyl groups, with each group containing in the range of from 1 carbon atom, or the appropriate minimum number of carbon atoms to form the group, up to about 20 carbon atoms. These hydrocarbyl groups may also contain heteroatoms including, but not limited to, nitrogen, oxygen, boron, silicon, sulfur, and phosphorus atoms. In one embodiment, X can be a carboxylate group, an alkoxide group, or an aryloxide group, with each group containing in the range of from 1 to about 20 carbon atoms.

Types of organomagnesium compounds that may be represented by the general formula RMgX include, but are not limited to, hydrocarbylmagnesium hydride, hydrocarbylmagnesium halide, hydrocarbylmagnesium carboxylate, hydrocarbylmagnesium alkoxide, and hydrocarbylmagnesium aryloxide.

Suitable organomagnesium compounds that may be represented by the general formula RMgX include, but are not limited to, methylmagnesium hydride, ethylmagnesium hydride, butylmagnesium hydride, hexylmagnesium hydride, phenylmagnesium hydride, benzylmagnesium hydride, methylmagnesium chloride, ethylmagnesium chloride, butylmagnesium chloride, hexylmagnesium chloride, phenylmagnesium chloride, benzylmagnesium chloride, methylmagnesium bromide, ethylmagnesium bromide, butylmagnesium bromide, hexylmagnesium bromide, phenylmagnesium bromide, benzylmagnesium bromide, methylmagnesium hexanoate, ethylmagnesium hexanoate, butylmagnesium hexanoate, hexylmagnesium hexanoate, phenylmagnesium hexanoate, benzylmagnesium hexanoate, methylmagnesium ethoxide, ethylmagnesium ethoxide, butylmagnesium ethoxide, hexylmagnesium ethoxide, phenylmagnesium ethoxide, benzylmagnesium ethoxide, methylmagnesium phenoxide, ethylmagnesium phenoxide, butylmagnesium phenoxide, hexylmagnesium phenoxide, phenylmagnesium phenoxide, and benzylmagnesium phenoxide.

As mentioned above, the catalyst systems employed in the present invention can include a halogen source. As used herein, the term halogen source refers to any substance including at least one halogen atom. In one or more embodiments, at least a portion of the halogen source can be provided by either of the above-described lanthanide-containing compound and/or the above-described alkylating agent, when those compounds contain at least one halogen atom. In other words, the lanthanide-containing compound can serve as both the lanthanide-containing compound and at least a portion of the halogen source. Similarly, the alkylating agent can serve as both the alkylating agent and at least a portion of the halogen source.

In another embodiment, at least a portion of the halogen source can be present in the catalyst systems in the form of a separate and distinct halogen-containing compound. Various compounds, or mixtures thereof, that contain one or more halogen atoms can be employed as the halogen source. Examples of halogen atoms include, but are not limited to, fluorine, chlorine, bromine, and iodine. A combination of two or more halogen atoms can also be utilized. Halogen-containing compounds that are soluble in a hydrocarbon solvent are suitable for use in the present invention. Hydrocarbon-insoluble halogen-containing compounds, however, can be suspended in a polymerization system to form the catalytically active species, and are therefore also useful.

Useful types of halogen-containing compounds that can be employed include, but are not limited to, elemental halogens, mixed halogens, hydrogen halides, organic halides, inorganic halides, metallic halides, and organometallic halides.

Elemental halogens suitable for use in the present invention include, but are not limited to, fluorine, chlorine, bromine, and iodine. Some specific examples of suitable mixed halogens include iodine monochloride, iodine monobromide, iodine trichloride, and iodine pentafluoride.

Hydrogen halides include, but are not limited to, hydrogen fluoride, hydrogen chloride, hydrogen bromide, and hydrogen iodide.

Organic halides include, but are not limited to, t-butyl chloride, t-butyl bromide, allyl chloride, allyl bromide, benzyl chloride, benzyl bromide, chloro-di-phenylmethane, bromo-di-phenylmethane, triphenylmethyl chloride, triphenylmethyl bromide, benzylidene chloride, benzylidene bromide (also called α,α-dibromotoluene or benzal bromide), methyltrichlorosilane, phenyltrichlorosilane, dimethyldichlorosilane, diphenyldichlorosilane, trimethylchlorosilane, benzoyl chloride, benzoyl bromide, propionyl chloride, propionyl bromide, methyl chloroformate, methyl bromoformate, carbon tetrabromide (also called tetrabromomethane), tribromomethane (also called bromoform), bromomethane, dibromomethane, 1-bromopropane, 2-bromopropane, 1,3-dibromopropane, 2,2-dimethyl-1-bromopropane (also called neopentyl bromide), formyl bromide, acetyl bromide, propionyl bromide, butyryl bromide, isobutyryl bromide, valeroyl bromide, isovaleryl bromide, hexanoyl bromide, benzoyl bromide, methyl bromoacetate, methyl 2-bromopropionate, methyl 3-bromopropionate, methyl 2-bromobutyrate, methyl 2-bromohexanoate, methyl 4-bromocrotonate, methyl 2-bromobenzoate, methyl 3-bromobenzoate, methyl 4-bromobenzoate, iodomethane, diiodomethane, triiodomethane (also called iodoform), tetraiodomethane, 1-iodopropane, 2-iodopropane, 1,3-diiodopropane, t-butyl iodide, 2,2-dimethyl-1-iodopropane (also called neopentyl iodide), allyl iodide, iodobenzene, benzyl iodide, diphenylmethyl iodide, triphenylmethyl iodide, benzylidene iodide (also called benzal iodide or α,α-diiodotoluene), trimethylsilyl iodide, triethylsilyl iodide, triphenylsilyl iodide, dimethyldiiodosilane, diethyldiiodosilane, diphenyldiiodosilane, methyltriiodosilane, ethyltriiodosilane, phenyltriiodosilane, benzoyl iodide, propionyl iodide, and methyl iodoformate.

Inorganic halides include, but are not limited to, phosphorus trichloride, phosphorus tribromide, phosphorus pentachloride, phosphorus oxychloride, phosphorus oxybromide, boron trifluoride, boron trichloride, boron tribromide, silicon tetrafluoride, silicon tetrachloride, silicon tetrabromide, silicon tetraiodide, arsenic trichloride, arsenic tribromide, arsenic triiodide, selenium tetrachloride, selenium tetrabromide, tellurium tetrachloride, tellurium tetrabromide, and tellurium tetraiodide.

Metallic halides include, but are not limited to, tin tetrachloride, tin tetrabromide, aluminum trichloride, aluminum tribromide, antimony trichloride, antimony pentachloride, antimony tribromide, aluminum triiodide, aluminum trifluoride, gallium trichloride, gallium tribromide, gallium triiodide, gallium trifluoride, indium trichloride, indium tribromide, indium triiodide, indium trifluoride, titanium tetrachloride, titanium tetrabromide, titanium tetraiodide, zinc dichloride, zinc dibromide, zinc diiodide, and zinc difluoride.

Organometallic halides include, but are not limited to, dimethylaluminum chloride, diethylaluminum chloride, dimethylaluminum bromide, diethylaluminum bromide, dimethylaluminum fluoride, diethylaluminum fluoride, methylaluminum dichloride, ethylaluminum dichloride, methylaluminum dibromide, ethylaluminum dibromide, methylaluminum difluoride, ethylaluminum difluoride, methylaluminum sesquichloride, ethylaluminum sesquichloride, isobutylaluminum sesquichloride, methylmagnesium chloride, methylmagnesium bromide, methylmagnesium iodide, ethylmagnesium chloride, ethylmagnesium bromide, butylmagnesium chloride, butylmagnesium bromide, phenylmagnesium chloride, phenylmagnesium bromide, benzylmagnesium chloride, trimethyltin chloride, trimethyltin bromide, triethyltin chloride, triethyltin bromide, di-t-butyltin dichloride, di-t-butyltin dibromide, dibutyltin dichloride, dibutyltin dibromide, tributyltin chloride, and tributyltin bromide.

In one or more embodiments, the above-described catalyst systems can comprise a compound containing a non-coordinating anion or a non-coordinating anion precursor. In one or more embodiments, a compound containing a non-coordinating anion, or a non-coordinating anion precursor can be employed in lieu of the above-described halogen source. A non-coordinating anion is a sterically bulky anion that does not form coordinate bonds with, for example, the active center of a catalyst system due to steric hindrance. Non-coordinating anions useful in the present invention include, but are not limited to, tetraarylborate anions and fluorinated tetraarylborate anions. Compounds containing a non-coordinating anion can also contain a counter cation, such as a carbonium, ammonium, or phosphonium cation. Exemplary counter cations include, but are not limited to, triarylcarbonium cations and N,N-dialkylanilinium cations. Examples of compounds containing a non-coordinating anion and a counter cation include, but are not limited to, triphenylcarbonium tetrakis(pentafluorophenyl)borate, N,N-dimethylanilinium tetrakis(pentafluorophenyl)borate, triphenylcarbonium tetrakis[3,5-bis(trifluoromethyl)phenyl]borate, and N,N-dimethylanilinium tetrakis[3,5-bis (trifluoromethyl)phenyl]borate.

A non-coordinating anion precursor can also be used in this embodiment. A non-coordinating anion precursor is a compound that is able to form a non-coordinating anion under reaction conditions. Useful non-coordinating anion precursors include, but are not limited to, triarylboron compounds, $BR_3$, where R is a strong electron-withdrawing aryl group, such as a pentafluorophenyl or 3,5-bis(trifluoromethyl)phenyl group.

The catalyst composition of this invention may be formed by combining or mixing the foregoing catalyst ingredients. Although one or more active catalyst species are believed to result from the combination of the catalyst ingredients, the degree of interaction or reaction between the various catalyst ingredients or components is not known with any great degree of certainty. Therefore, the term active catalyst or catalyst composition has been employed to encompass a simple mixture of the ingredients, a complex of the various ingredients that is caused by physical or chemical forces of attraction, a chemical reaction product of the ingredients, or a combination of the foregoing ingredients, so long as this mixture, complex, reaction product, or combination is capable of polymerizing monomer as discussed above.

The foregoing lanthanide-based catalyst composition may have high catalytic activity for polymerizing conjugated dienes into cis-1,4-polydienes over a wide range of catalyst concentrations and catalyst ingredient ratios. Several factors may impact the optimum concentration of any one of the catalyst ingredients. For example, because the catalyst ingredients may interact to form an active species, the optimum concentration for any one catalyst ingredient may be dependent upon the concentrations of the other catalyst ingredients.

In one or more embodiments, the molar ratio of the alkylating agent to the lanthanide compound (alkylating agent/Ln) can be varied from about 1:1 to about 1,000:1, in other embodiments from about 2:1 to about 500:1, and in other embodiments from about 5:1 to about 200:1.

In those embodiments where both an aluminoxane and at least one other organoaluminum agent are employed as alkylating agents, the molar ratio of the aluminoxane to the lanthanide compound (aluminoxane/Ln) can be varied from 5:1 to about 1,000:1, in other embodiments from about 10:1 to about 700:1, and in other embodiments from about 20:1 to about 500:1; and the molar ratio of the at least one other organoaluminum compound to the lanthanide compound (Al/Ln) can be varied from about 1:1 to about 200:1, in other embodiments from about 2:1 to about 150:1, and in other embodiments from about 5:1 to about 100:1.

The molar ratio of the halogen source to the lanthanide compound is best described in terms of the ratio of the moles of halogen atoms in the halogen source to the moles of lanthanide atoms in the lanthanide compound (halogen/Ln). In one or more embodiments, the halogen/Ln molar ratio can be varied from about 0.5:1 to about 20:1, in other embodiments from about 1:1 to about 10:1, and in other embodiments from about 2:1 to about 6:1.

In relevant embodiments, the molar ratio of the non-coordinating anion or non-coordinating anion precursor to the lanthanide compound (An/Ln) may be from about 0.5:1 to about 20:1, in other embodiments from about 0.75:1 to about 10:1, and in other embodiments from about 1:1 to about 6:1.

The active catalyst can be formed by various methods.

In one or more embodiments, the active catalyst may be preformed by using a preforming procedure. That is, the catalyst ingredients are pre-mixed outside the polymerization system either in the absence of any monomer or in the presence of a small amount of at least one conjugated diene monomer at an appropriate temperature, which may be from about 20° C. to about 80° C. The resulting catalyst composition may be referred to as a preformed catalyst. The preformed catalyst may be aged, if desired, prior to being added to the monomer that is to be polymerized. As used herein, reference to a small amount of monomer refers to a catalyst loading of greater than 2 mmol, in other embodiments greater than 3 mmol, and in other embodiments greater than 4 mmol of lanthanide-containing compound per 100 g of monomer during the catalyst formation. In particular embodiments, the preformed catalyst may be prepared by an in-line preforming procedure whereby the catalyst ingredients are introduced into a feed line wherein they are mixed either in the absence of any monomer or in the presence of a small amount of at least one conjugated diene monomer. The resulting preformed catalyst can be either stored for future use or directly fed to the monomer that is to be polymerized.

In other embodiments, the active catalyst may be formed in situ by adding the catalyst ingredients, in either a stepwise or simultaneous manner, to the monomer to be polymerized. In one embodiment, the alkylating agent can be added first, followed by the lanthanide-containing compound, and then followed by the halogen source or by the compound containing a non-coordinating anion or the non-coordinating anion precursor. In one or more embodiments, two of the catalyst ingredients can be pre-combined prior to addition to the monomer. For example, the lanthanide-containing compound and the alkylating agent can be pre-combined and added as a single stream to the monomer. Alternatively, the halogen source and the alkylating agent can be pre-combined and added as a single stream to the monomer. An in situ formation of the catalyst may be characterized by a catalyst loading of less than 2 mmol, in other embodiments less than 1 mmol, in other embodiments less than 0.2 mmol, in other embodiments less than 0.1 mmol, in other embodiments less than 0.05 mmol, and in other embodiments less than or equal to 0.006 mmol of lanthanide-containing compound per 100 g of monomer during the catalyst formation.

In one or more embodiments, the active catalyst is formed in the substantial absence of a hydrocarbyloxysilane compound. As used herein, reference to a substantial absence refers to that amount of hydrocarbyloxysilane compound or less that will not impact the formation or performance of the catalyst. In one or more embodiments, the active catalyst is formed in the presence of less than 10 mole, in other embodiments in the presence of less than 2 mole, in other embodiments in the presence of less than 1 mole, and in other embodiments in the presence of less than 0.1 mole of hydrocarbyloxysilane compound per mole of lanthanide metal in the lanthanide-containing compound. In other embodiments, the catalyst is formed in the essential absence of a hydrocarbyloxysilane compound, which refers to a de minimis amount or less of hydrocarbyloxysilane compound. In particular embodiments, the active catalyst is formed in the complete absence of hydrocarbyloxysilane compound.

The combination of the active catalyst and the hydrocarbyloxysilane compound may take place by various methods.

In one or more embodiments, where the active catalyst is preformed, the hydrocarbyloxysilane compound may be premixed along with the catalyst ingredients or added subsequently to the combination of the catalyst ingredients. In certain embodiments, the where the active catalyst is aged, the hydrocarbyloxysilane compound may be aged along with the active catalyst. In one or more embodiments, the hydrocarbyloxysilane compound may be added to the preformed catalyst prior to the introduction of the preformed catalyst to the polymerization system.

In other embodiments, the hydrocarbyloxysilane compound and the preformed catalyst may be added simultaneously, yet separately and individually, to the monomer solution (or bulk monomer) that is to be polymerized.

In other embodiments, the hydrocarbyloxysilane compound is introduced directly and individually to the monomer solution (or bulk monomer) that is to be polymerized. In other words, prior to being introduced to the polymerization system, the hydrocarbyloxysilane compound is not combined with the various catalyst ingredients. In one or more embodiments, the hydrocarbyloxysilane compound may be present in the monomer solution (or bulk monomer) prior to the introduction of the preformed catalyst. For example, the hydrocarbyloxysilane compound is introduced directly and individually to the monomer solution (or bulk monomer), and then the preformed catalyst is introduced to the mixture of the monomer and hydrocarbyloxysilane compound. In these embodiments, the introduction of the hydrocarbyloxysilane compound to the monomer solution (or bulk monomer) forms a monomer/hydrocarbyloxysilane compound blend that is devoid of active catalyst prior to the introduction of the preformed catalyst.

In other embodiments, the hydrocarbyloxysilane compound is introduced to the preformed catalyst before the preformed catalyst is introduced to the monomer solution (or bulk monomer). Therefore, in these embodiments, the hydrocarbyloxysilane compound and the preformed catalyst are introduced to the monomer solution (or bulk monomer) as a single stream. For example, where the preformed catalyst is prepared by an in-line preforming procedure as described above, the hydrocarbyloxysilane compound can be added to the preformed catalyst in line after formation of the catalyst. In some embodiments, the stream including the hydrocarbyloxysilane compound and the preformed catalyst is introduced to the monomer solution (or bulk monomer) within a relatively short time after the hydrocarbyloxysilane compound and the preformed catalyst are brought into contact. In particular embodiments, the stream including the hydrocarbyloxysilane compound and the preformed catalyst is introduced to the monomer solution (or bulk monomer) within less than one minute after the hydrocarbyloxysilane compound and the preformed catalyst are brought into contact.

In other embodiments, where the active catalyst is formed in situ, the hydrocarbyloxysilane compound may added alongside the catalyst ingredients, in either a stepwise or simultaneous manner, to the monomer to be polymerized.

In other embodiments, the hydrocarbyloxysilane compound is introduced to the monomer solution (or bulk monomer) after introduction of the catalyst ingredients for forming the active catalyst or introduction of the preformed catalyst. In other words, the hydrocarbyloxysilane compound is introduced to the monomer solution (or bulk monomer) that contains the active catalyst. As described above, the active catalyst may be formed by a preforming procedure or in situ. As those skilled in the art appreciate, where the active catalyst is present in the monomer solution (or bulk monomer) prior to the introduction of the hydrocarbyloxysilane compound, the active catalyst may be in the form of propagating oligomeric species at the time the hydrocarbyloxysilane compound is introduced. In this regard, those skilled in the art will appreciate that reference to active catalyst may refer to low molecular weight living or pseudo-living oligomeric species. In one or more embodiments, the hydrocarbyloxysilane compound is introduced before 5%, in other embodiments before 3%, in other embodiments before 1%, and in other embodiments before 0.5% of the monomer is polymerized.

Regardless of how the active catalyst and the hydrocarbyloxysilane compound are combined, the polymerization of conjugated diene monomer is conducted in the presence of the active catalyst and the hydrocarbyloxysilane compound. In one or more embodiments, polymerizing conjugated diene monomer in the presence of a hydrocarbyloxysilane compound refers to a polymerization where a substantial amount of the polymer was prepared in the presence of a hydrocarbyloxysilane compound. In one or more embodiments, more than 50%, in other embodiments more than 75%, and in other embodiments more than 90% of the polymer is polymerized in the presence of a hydrocarbyloxysilane compound. In certain embodiments, all or essentially all of the polymer is polymerized in the presence of a hydrocarbyloxysilane compound.

As mentioned above, the polymerization of conjugated diene monomer can be conducted in presence of the active catalyst and a hydrocarbyloxysilane compound. Hydrocarbyloxysilane compounds include any silane compound containing at least one hydrocarbyloxy group bonded to a silicon atom. Those skilled in the art will appreciate that a hydrocarbyloxy group may be defined by the formula —OR, where R is a hydrocarbon group.

In one or more embodiments, the hydrocarbyloxy groups of the hydrocarbyloxysilane compounds may include, but are not limited to, alkyloxy, cycloalkyloxy, alkenyloxy, cycloalkenyloxy, aryloxy, allyloxy, aralkyloxy, alkaryloxy, or alkynyloxy groups. In one or more embodiments, the hydrocarbyloxy group may be a substituted hydrocarbyloxy group. Substituted hydrocarbyloxy groups include hydrocarbyloxy groups in which one or more hydrogen atoms have been replaced by a substituent such as a hydrocarbyl, hydrocarbyloxy, silyl, or siloxy group. In one or more embodiments, these groups may include from one, or the appropriate minimum number of carbon atoms to form the group, to about 20 carbon atoms. These groups may also contain heteroatoms such as, but not limited to, nitrogen, boron, oxygen, silicon, sulfur, tin, and phosphorus atoms. In one or more embodiments, the hydrocarbyloxy organic groups of the hydrocarbyloxysilane compounds may be a selected from or alkyloxy, cycloalkyloxy, aryloxy, aralkyloxy, or alkaryloxy groups.

In one or more embodiments, the hydrocarbyloxysilane compounds may be monomeric, dimeric, trimeric, tetrameric, oligomeric, or polymeric. In these or other embodiments, the hydrocarbyloxysilane compounds may have a cyclic or acyclic structure. A combination of two or more hydrocarbyloxysilane may be employed. As will be described in more detail below, several species of suitable hydrocarbyloxysilane compounds can include a halogen atom, and therefore where the silane compound includes a halogen atom, the silane compound may also serve as all or part of the halogen source in the above-mentioned catalyst system. In one or more embodiments, the hydrocarbyloxysilane compound does not include an allyl group, such as a vinyl group.

In one or more embodiments, the hydrocarbyloxysilane compounds may be defined by the formula I

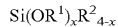

$$Si(OR^1)_x R^2_{4-x}$$

where x is an integer from 1 to 4, each $R^1$ is independently a hydrocarbyl group, and each $R^2$ is independently a hydrogen atom, a halogen atom, or a monovalent organic group, or where two or more $R^2$ groups may join to form a polyvalent organic group. For purposes of this specification, polyvalent organic group refers to an organic group that has a valence of two or more, such as a divalent, trivalent or tetravalent organic group. In one or more embodiments, the hydrocarbyloxysilane compound formed when two or more $R^2$ groups join together may be monocyclic, bicyclic, tricyclic, or polycyclic.

In one or more embodiments, the monovalent organic groups of the hydrocarbyloxysilane compounds may be hydrocarbyl groups, which include, but are not limited to, alkyl, cycloalkyl, alkenyl, cycloalkenyl, aryl, allyl, aralkyl, alkaryl, or alkynyl groups. Hydrocarbyl groups also include substituted hydrocarbyl groups, which refer to hydrocarbyl groups in which one or more hydrogen atoms have been replaced by a substituent such as a hydrocarbyl, hydrocarbyloxy, silyl, or silyloxy group. In one or more embodiments, these groups may include from one, or the appropriate minimum number of carbon atoms to form the group, to about 20 carbon atoms. These groups may also contain heteroatoms such as, but not limited to, nitrogen, boron, oxygen, silicon, sulfur, tin, and phosphorus atoms. In one or more embodiments, the monovalent organic groups of the hydrocarbyloxysilane compounds may be a hydrocarbon group selected from or alkyl, cycloalkyl, aryl, aralkyl, or alkaryl groups.

In one or more embodiments, where the hydrocarbyloxysilane compound is defined by formula 1 and contains three hydrocarbyl groups and one hydrocarbyloxy group, the hydrocarbyloxysilane compound may be referred to as a trihydrocarbyl hydrocarbyloxy silane. In one or more embodiments, where the hydrocarbyloxysilane compound is defined by formula 1 and contains two hydrocarbyl groups and two hydrocarbyloxy group, the hydrocarbyloxysilane compound may be referred to as a dihydrocarbyl dihydrocarbyloxy silane. In one or more embodiments, where the hydrocarbyloxysilane compound is defined by formula 1 and contains one hydrocarbyl groups and three hydrocarbyloxy group, the hydrocarbyloxysilane compound may be referred to as a hydrocarbyl trihydrocarbyloxy silane.

Representative examples of suitable trihydrocarbyl hydrocarbyloxy silane compounds include, but are not limited to, trialkyl alkyloxy silane, trialkyl cycloalkyloxy silane, trialkyl aryloxy silane, trialkyl aralkyloxy silane, trialkyl alkaryloxy silane, tricycloalkyl alkyloxy silane, tricycloalkyl cycloalkyloxy silane, tricycloalkyl aryloxy silane, tricycloalkyl aralkyloxy silane, tricycloalkyl alkaryloxy silane, triaryl alkyloxy silane, triaryl cycloalkyloxy silane, triaryl aryloxy silane, triaryl aralkyloxy silane, triaryl alkaryloxy silane, triaralkyl alkyloxy silane, triaralkyl cycloalkyloxy silane, triaralkyl aryloxy silane, triaralkyl aralkyloxy silane, triaralkyl alkaryloxy silane, trialkaryl alkyloxy silane, trialkaryl cycloalkyloxy silane, trialkaryl aryloxy silane, trialkaryl aralkyloxy silane, trialkaryl alkaryloxy silane, dialkyl cycloalkyl alkyloxy silane, dialkyl cycloalkyl cycloalkyloxy silane, dialkyl cycloalkyl aryloxy silane, dialkyl cycloalkyl aralkyloxy silane, dialkyl cycloalkyl alkaryloxy silane, alkyl dicycloalkyl alkyloxy silane, alkyl dicycloalkyl cycloalkyloxy silane, alkyl dicycloalkyl aryloxy silane, alkyl dicycloalkyl aralkyloxy silane, alkyl dicycloalkyl alkaryloxy silane, dialkyl aryl alkyloxy silane, dialkyl aryl cycloalkyloxy silane, dialkyl aryl aryloxy silane, dialkyl aryl aralkyloxy silane, dialkyl aryl alkaryloxy silane, alkyl diaryl alkyloxy silane, alkyl diaryl cycloalkyloxy silane, alkyl diaryl aryloxy silane, alkyl diaryl aralkyloxy silane, alkyl diaryl alkaryloxy silane, alkyl aryl cycloalkyl alkyloxy silane, alkyl aryl cycloalkyl cycloalkyloxy silane, alkyl aryl cycloalkyl aryloxy silane, alkyl aryl cycloalkyl aralkyloxy silane, and alkyl aryl cycloalkyl alkaryloxy silane.

Representative examples of suitable dihydrocarbyl dihydrocarbyloxy silane compounds include, but are not limited to, dialkyl dialkyloxy silane, dialkyl dicycloalkyloxy silane, dialkyl diaryloxy silane, dialkyl diaralkyloxy silane, dialkyl dialkaryloxy silane, dialkyl alkyloxy cycloalkyloxy silane, dialkyl alkyloxy aryloxy silane, dialkyl aryloxy cycloalkyloxy silane, dicycloalkyl dialkyloxy silane, dicycloalkyl dicycloalkyloxy silane, dicycloalkyl diaryloxy silane, dicycloalkyl diaralkyloxy silane, dicycloalkyl dialkaryloxy silane, dicycloalkyl alkyloxy cycloalkyloxy silane, dicycloalkyl alkyloxy aryloxy silane, dicycloalkyl aryloxy cycloalkyloxy silane, diaryl dialkyloxy silane, diaryl dicycloalkyloxy silane, diaryl diaryloxy silane, diaryl diaralkyloxy silane, diaryl dialkaryloxy silane, diaryl alkyloxy cycloalkyloxy silane, diaryl alkyloxy aryloxy silane, diaryl aryloxy cycloalkyloxy silane, diaralkyl dialkyloxy silane, diaralkyl dicycloalkyloxy silane, diaralkyl diaryloxy silane, diaralkyl diaralkyloxy silane, diaralkyl dialkaryloxy silane, diaralkyl alkyloxy cycloalkyloxy silane, diaralkyl alkyloxy aryloxy silane, diaralkyl aryloxy cycloalkyloxy silane, dialkaryl dialkyloxy silane, dialkaryl dicycloalkyloxy silane, dialkaryl diaryloxy silane, dialkaryl diaralkyloxy silane, dialkaryl dialkaryloxy silane, dialkaryl alkyloxy cycloalkyloxy silane, dialkaryl alkyloxy aryloxy silane, dialkaryl aryloxy cycloalkyloxy silane, alkyl cycloalkyl dialkyloxy silane, alkyl cycloalkyl dicycloalkyloxy silane, alkyl cycloalkyl diaryloxy silane, alkyl cycloalkyl diaralkyloxy silane, alkyl cycloalkyl dialkaryloxy silane, alkyl cycloalkyl alkyloxy cycloalkyloxy silane, alkyl cycloalkyl alkyloxy aryloxy silane, alkyl cycloalkyl aryloxy cycloalkyloxy silane, alkyl aryl dialkyloxy silane, alkyl aryl dicycloalkyloxy silane, alkyl aryl diaryloxy silane, alkyl aryl diaralkyloxy silane, alkyl aryl dialkaryloxy silane, alkyl aryl alkyloxy cycloalkyloxy silane, alkyl aryl alkyloxy aryloxy silane, alkyl aryl aryloxy cycloalkyloxy silane, aryl cycloalkyl dialkyloxy silane, aryl cycloalkyl dicycloalkyloxy silane, aryl cycloalkyl diaryloxy silane, aryl cycloalkyl diaralkyloxy silane, aryl cycloalkyl dialkaryloxy silane, aryl cycloalkyl alkyloxy cycloalkyloxy silane, aryl cycloalkyl alkyloxy aryloxy silane, and aryl cycloalkyl aryloxy cycloalkyloxy silane.

Representative examples of suitable hydrocarbyl trihydrocarbyloxy silane compounds include, but are not limited to, alkyl trialkyloxy silane, alkyl tricycloalkyloxy silane, alkyl triaryloxy silane, alkyl triaralkyloxy silane, alkyl trialkaryloxy silane, alkyl dialkyloxy cycloalkyloxy silane, alkyl alkyloxy dicycloalkyloxy silane, alkyl dialkyloxy aryloxy silane, alkyl alkyloxy diaryloxy silane, alkyl alkyloxy aryloxy cycloalkyloxy silane, cycloalkyl trialkyloxy silane, cycloalkyl tricycloalkyloxy silane, cycloalkyl triaryloxy silane, cycloalkyl triaralkyloxy silane, cycloalkyl trialkaryloxy silane, cycloalkyl dialkyloxy cycloalkyloxy silane, cycloalkyl alkyloxy dicycloalkyloxy silane, cycloalkyl dialkyloxy aryloxy silane, cycloalkyl alkyloxy diaryloxy silane, cycloalkyl alkyloxy aryloxy cycloalkyloxy silane, aryl trialkyloxy silane, aryl tricycloalkyloxy silane, aryl triaryloxy silane, aryl triaralkyloxy silane, aryl trialkaryloxy silane, aryl dialkyloxy cycloalkyloxy silane, aryl alkyloxy dicycloalkyloxy silane, aryl dialkyloxy aryloxy silane, aryl alkyloxy diaryloxy silane, aryl alkyloxy aryloxy cycloalkyloxy silane, aralkyl trialkyloxy silane, aralkyl tricycloalkyloxy silane, aralkyl triaryloxy silane, aralkyl triaralkyloxy silane, aralkyl trialkaryloxy silane, aralkyl dialkyloxy cycloalkyloxy silane, aralkyl alkyloxy dicycloalkyloxy silane, aralkyl dialkyloxy aryloxy silane, aralkyl alkyloxy diaryloxy silane, aralkyl alkyloxy aryloxy cycloalkyloxy silane, alkaryl trialkyloxy silane, alkaryl tricycloalkyloxy silane, alkaryl triaryloxy silane, alkaryl triaralkyloxy silane, alkaryl trialkaryloxy silane, alkaryl dialkyloxy cycloalkyloxy silane, alkaryl alkyloxy dicycloalkyloxy silane, alkaryl dialkyloxy aryloxy silane, alkaryl alkyloxy diaryloxy silane, and alkaryl alkyloxy aryloxy cycloalkyloxy silane.

Specific examples of suitable trihydrocarbyl hydrocarbyloxy silane compounds include, but are not limited to, trimethyl methoxy silane, trimethyl ethoxy silane, trimethyl phenoxy silane, triethyl methoxy silane, triethyl ethoxy silane, triethyl phenoxy silane, tri-n-propyl methoxy silane, tri-n-propyl ethoxy silane, tri-n-propyl phenoxy silane, triisopropyl methoxy silane, triisopropyl ethoxy silane, triisopropyl phenoxy silane, tri-n-butyl methoxy silane, tri-n-butyl ethoxy silane, tri-n-butyl phenoxy silane, tri-t-butyl methoxy silane, tri-t-butyl ethoxy silane, tri-t-butyl phenoxy silane, trineopentyl methoxy silane, trineopentyl ethoxy silane, trineopentyl phenoxy silane, tri-n-pentyl methoxy silane, tri-n-pentyl ethoxy silane, tri-n-pentyl phenoxy silane, tri-n-hexyl methoxy silane, tri-n-hexyl ethoxy silane, tri-n-hexyl phenoxy silane, tribenzyl methoxy silane, tribenzyl ethoxy silane, tribenzyl phenoxy silane, tricyclohexyl methoxy silane, tricyclohexyl ethoxy silane, tricyclohexyl phenoxy silane, triphenyl methoxy silane, triphenyl ethoxy silane, triphenyl phenoxy silane, dimethyl ethyl methoxy silane, dimethyl ethyl ethoxy silane, dimethyl ethyl phenoxy silane, dimethyl isopropyl methoxy silane, dimethyl isopropyl ethoxy silane, dimethyl isopropyl phenoxy silane, dimethyl phenyl methoxy silane, dimethyl phenyl ethoxy silane, dimethyl phenyl phenoxy silane, ethyl diphenyl methoxy silane, ethyl diphenyl ethoxy silane, ethyl diphenyl phenoxy silane, isopropyl diphenyl methoxy silane, isopropyl diphenyl ethoxy silane, isopropyl diphenyl phenoxy silane, isopropyl diethyl methoxy silane, isopropyl diethyl ethoxy silane, isopropyl diethyl phenoxy silane, dimethyl cyclohexyl methoxy silane, dimethyl cyclohexyl ethoxy silane, dimethyl cyclohexyl phenoxy silane, diethyl cyclohexyl methoxy silane, diethyl cyclohexyl ethoxy silane, and diethyl cyclohexyl phenoxy silane.

Specific examples of suitable dihydrocarbyl dihydrocarbyloxy silane compounds include, but are not limited to, dimethyl dimethoxy silane, dimethyl diethoxy silane, dimethyl diphenoxy silane, dimethyl methoxy ethoxy silane, dimethyl methoxy phenoxy silane, dimethyl phenoxy ethoxy silane, diethyl dimethoxy silane, diethyl diethoxy silane, diethyl diphenoxy silane, diethyl methoxy ethoxy silane, diethyl methoxy phenoxy silane, diethyl phenoxy ethoxy silane, di-n-propyl dimethoxy silane, di-n-propyl diethoxy silane, di-n-propyl diphenoxy silane, di-n-propyl methoxy ethoxy silane, di-n-propyl methoxy phenoxy silane, di-n-propyl phenoxy ethoxy silane, diisopropyl dimethoxy silane, diisopropyl diethoxy silane, diisopropyl diphenoxy silane, diisopropyl methoxy ethoxy silane, diisopropyl methoxy phenoxy silane, diisopropyl phenoxy ethoxy silane, di-n-butyl dimethoxy silane, di-n-butyl diethoxy silane, di-n-butyl diphenoxy silane, di-n-butyl methoxy ethoxy silane, di-n-butyl methoxy phenoxy silane, di-n-butyl phenoxy ethoxy silane, di-t-butyl dimethoxy silane, di-t-butyl diethoxy silane, di-t-butyl diphenoxy silane, di-t-butyl methoxy ethoxy silane, di-t-butyl methoxy phenoxy silane, di-t-butyl phenoxy ethoxy silane, dineopentyl dimethoxy silane, dineopentyl diethoxy silane, dineopentyl diphenoxy silane, dineopentyl methoxy ethoxy silane, dineopentyl methoxy phenoxy silane, dineopentyl phenoxy ethoxy silane, di-n-pentyl dimethoxy silane, di-n-pentyl diethoxy silane, di-n-pentyl diphenoxy silane, di-n-pentyl methoxy ethoxy silane, di-n-pentyl methoxy phenoxy silane, di-n-pentyl phenoxy ethoxy silane, di-n-hexyl dimethoxy silane, di-n-hexyl diethoxy silane, di-n-hexyl diphenoxy silane, di-n-hexyl methoxy ethoxy silane, di-n-hexyl methoxy phenoxy silane, di-n-hexyl phenoxy ethoxy silane, dibenzyl dimethoxy silane, dibenzyl diethoxy silane, dibenzyl diphenoxy silane, dibenzyl methoxy ethoxy silane, dibenzyl methoxy phenoxy silane, dibenzyl phenoxy ethoxy silane, diphenyl dimethoxy silane, diphenyl diethoxy silane, diphenyl diphenoxy silane, diphenyl methoxy ethoxy silane, diphenyl methoxy phenoxy silane, diphenyl phenoxy ethoxy silane, dicyclohexyl dimethoxy silane, dicyclohexyl diethoxy silane, dicyclohexyl diphenoxy silane, dicyclohexyl methoxy ethoxy silane, dicyclohexyl methoxy phenoxy silane, dicyclohexyl phenoxy ethoxy silane, methyl ethyl dimethoxy silane, methyl ethyl diethoxy silane, methyl ethyl diphenoxy silane, methyl ethyl methoxy ethoxy silane, methyl ethyl methoxy phenoxy silane, methyl ethyl phenoxy ethoxy silane, methyl isopropyl dimethoxy silane, methyl isopropyl diethoxy silane, methyl isopropyl diphenoxy silane, methyl isopropyl methoxy ethoxy silane, methyl isopropyl methoxy phenoxy silane, methyl isopropyl phenoxy ethoxy silane, methyl phenyl dimethoxy silane, methyl phenyl diethoxy silane, methyl phenyl diphenoxy silane, methyl phenyl methoxy ethoxy silane, methyl phenyl methoxy phenoxy silane, methyl phenyl phenoxy ethoxy silane, ethyl phenyl dimethoxy silane, ethyl phenyl diethoxy silane, ethyl phenyl diphenoxy silane, ethyl phenyl methoxy ethoxy silane, ethyl phenyl methoxy phenoxy silane, ethyl phenyl phenoxy ethoxy silane, isopropyl phenyl dimethoxy silane, isopropyl phenyl diethoxy silane, isopropyl phenyl diphenoxy silane, isopropyl phenyl methoxy ethoxy silane, isopropyl phenyl methoxy phenoxy silane, isopropyl phenyl phenoxy ethoxy silane, isopropyl ethyl dimethoxy silane, isopropyl ethyl diethoxy silane, isopropyl ethyl diphenoxy silane, isopropyl ethyl methoxy ethoxy silane, isopropyl ethyl methoxy phenoxy silane, isopropyl ethyl phenoxy ethoxy silane, methyl cyclohexyl dimethoxy silane, methyl cyclohexyl diethoxy silane, methyl cyclohexyl diphenoxy silane, methyl cyclohexyl methoxy ethoxy silane, methyl cyclohexyl methoxy phenoxy silane, methyl cyclohexyl phenoxy ethoxy silane, ethyl cyclohexyl dimethoxy silane, ethyl cyclohexyl diethoxy silane, ethyl cyclohexyl diphenoxy silane, ethyl cyclohexyl methoxy ethoxy silane, ethyl cyclohexyl methoxy phenoxy silane, and ethyl cyclohexyl phenoxy ethoxy silane.

Specific examples of suitable hydrocarbyl trihydrocarbyloxy silane compounds include, but are not limited to, methyl trimethoxy silane, methyl triethoxy silane, methyl triphenoxy silane, methyl dimethoxy ethoxy silane, methyl dimethoxy phenoxy silane, methyl diphenoxy ethoxy silane, methyl methoxy ethoxy phenoxy silane, ethyl trimethoxy silane, ethyl triethoxy silane, ethyl triphenoxy silane, ethyl dimethoxy ethoxy silane, ethyl dimethoxy phenoxy silane, ethyl diphenoxy ethoxy silane, ethyl methoxy ethoxy phenoxy silane, n-propyl trimethoxy silane, n-propyl triethoxy silane, n-propyl triphenoxy silane, n-propyl dimethoxy ethoxy silane, n-propyl dimethoxy phenoxy silane, n-propyl diphenoxy ethoxy silane, n-propyl methoxy ethoxy phenoxy silane, isopropyl trimethoxy silane, isopropyl triethoxy silane, isopropyl triphenoxy silane, isopropyl dimethoxy ethoxy silane, isopropyl dimethoxy phenoxy silane, isopropyl diphenoxy ethoxy silane, isopropyl methoxy ethoxy phenoxy silane, n-butyl trimethoxy silane, n-butyl triethoxy silane, n-butyl triphenoxy silane, n-butyl dimethoxy ethoxy silane, n-butyl dimethoxy phenoxy silane, n-butyl diphenoxy ethoxy silane, n-butyl methoxy ethoxy phenoxy silane, t-butyl trimethoxy silane, t-butyl triethoxy silane, t-butyl triphenoxy silane, t-butyl dimethoxy ethoxy silane, t-butyl dimethoxy phenoxy silane, t-butyl diphenoxy ethoxy silane, t-butyl methoxy ethoxy phenoxy silane, neopentyl trimethoxy silane, neopentyl triethoxy silane, neopentyl triphenoxy silane, neopentyl dimethoxy ethoxy silane, neopentyl dimethoxy phenoxy silane, neopentyl diphenoxy ethoxy silane, neopentyl methoxy ethoxy phenoxy silane, n-pentyl trimethoxy silane, n-pentyl triethoxy silane, n-pentyl triphenoxy silane, n-pentyl dimethoxy ethoxy silane, n-pentyl dimethoxy phenoxy silane, n-pentyl diphenoxy ethoxy silane, n-pentyl methoxy ethoxy phenoxy silane, n-hexyl trimethoxy silane, n-hexyl triethoxy silane, n-hexyl triphenoxy silane, n-hexyl dimethoxy ethoxy silane, n-hexyl dimethoxy phenoxy silane, n-hexyl diphenoxy ethoxy silane, n-hexyl methoxy ethoxy phenoxy silane, benzyl trimethoxy silane, benzyl triethoxy silane, benzyl triphenoxy silane, benzyl dimethoxy ethoxy silane, benzyl dimethoxy phenoxy silane, benzyl diphenoxy ethoxy silane, benzyl methoxy ethoxy phenoxy silane, phenyl trimethoxy silane, phenyl triethoxy silane, phenyl triphenoxy silane, phenyl dimethoxy ethoxy silane, phenyl dimethoxy phenoxy silane, phenyl diphenoxy ethoxy silane, phenyl methoxy ethoxy phenoxy silane, cyclohexyl trimethoxy silane, cyclohexyl triethoxy silane, cyclohexyl triphenoxy silane, cyclohexyl dimethoxy ethoxy silane, cyclohexyl dimethoxy phenoxy silane, cyclohexyl diphenoxy ethoxy silane, and cyclohexyl methoxy ethoxy phenoxy silane.

In one or more embodiments, the amount of the hydrocarbyloxysilane compound present during the polymerization (i.e. present in the polymerization mixture) may be represented by the molar ratio of the hydrocarbyloxysilane compound to the lanthanide-containing compound (hydrocarbyloxysilane compound/Ln). In one or more embodiments, the hydrocarbyloxysilane compound/Ln molar ratio is at least 0.1:1, in other embodiments at least 0.5:1, in other embodiments at least 1:1, in other embodiments at least 5:1, and in other embodiments at least 10:1. In these or other embodiments, the hydrocarbyloxysilane compound/Ln molar ratio is less than 50:1, in other embodiments less than 20:1, and in other embodiments less than 10:1. In one or more embodiments, the hydrocarbyloxysilane compound/Ln molar ratio is from about 0.1:1 to about 50:1, in other embodiments from about 1:1 to about 20:1, and in other embodiments from about 5:1 to about 10:1.

In other embodiments, the amount of the hydrocarbyloxysilane compound present during the polymerization (i.e. present in the polymerization mixture) may be expressed with respect to the amount of the monomer. In one or more embodiments, the amount of the hydrocarbyloxysilane compound is at least 0.01 mmol, in other embodiments at least 0.05 mmol, in other embodiments at least 0.1 mmol, in other embodiments at least 0.5 mmol, and in other embodiments at least 1 mmol per 100 g of monomer. In these or other embodiments, the amount of the hydrocarbyloxysilane compound is less than 100 mmol, in other embodiments less than 90 mmol, in other embodiments less than 70 mmol, in other embodiments less than 60 mmol, in other embodiments less than 40 mmol, in other embodiments less than 20 mmol, and in other embodiments less than 10 mmol per 100 g of monomer.

In one or more embodiments, a solvent may be employed as a carrier to either dissolve or suspend the catalyst or catalyst ingredients in order to facilitate the delivery of the catalyst or catalyst ingredients to the polymerization system. In other embodiments, conjugated diene monomer can be used as the catalyst carrier. In yet other embodiments, the catalyst ingredients can be used in their neat state without any solvent.

In one or more embodiments, suitable solvents include those organic compounds that will not undergo polymerization or incorporation into propagating polymer chains during the polymerization of monomer in the presence of catalyst. In one or more embodiments, these organic species are liquid at ambient temperature and pressure. In one or more embodiments, these organic solvents are inert to the catalyst. Exemplary organic solvents include hydrocarbons with a low or relatively low boiling point such as aromatic hydrocarbons, aliphatic hydrocarbons, and cycloaliphatic hydrocarbons. Non-limiting examples of aromatic hydrocarbons include benzene, toluene, xylenes, ethylbenzene, diethylbenzene, and mesitylene. Non-limiting examples of aliphatic hydrocarbons include n-pentane, n-hexane, n-heptane, n-octane, n-nonane, n-decane, isopentane, isohexanes, isopentanes, isooctanes, 2,2-dimethylbutane, petroleum ether, kerosene, and petroleum spirits. And, non-limiting examples of cycloaliphatic hydrocarbons include cyclopentane, cyclohexane, methylcyclopentane, and methylcyclohexane. Mixtures of the above hydrocarbons may also be used. As is known in the art, aliphatic and cycloaliphatic hydrocarbons may be desirably employed for environmental reasons. The low-boiling hydrocarbon solvents are typically separated from the polymer upon completion of the polymerization.

Other examples of organic solvents include high-boiling hydrocarbons of high molecular weights, such as paraffinic oil, aromatic oil, or other hydrocarbon oils that are commonly used to oil-extend polymers. Since these hydrocarbons are non-volatile, they typically do not require separation and remain incorporated in the polymer.

The production of polydienes according to this invention can be accomplished by polymerizing conjugated diene monomer in the presence of a catalytically effective amount of the foregoing catalyst composition. The introduction of the catalyst composition, the conjugated diene monomer, and any solvent if employed forms a polymerization mixture in which the polymer product is formed. The total catalyst concentration to be employed in the polymerization mixture may depend on the interplay of various factors such as the purity of the ingredients, the polymerization temperature, the polymerization rate and conversion desired, the molecular weight desired, and many other factors. Accordingly, a specific total catalyst concentration cannot be definitively set forth except to say that catalytically effective amounts of the respective catalyst ingredients can be used. In one or more embodiments, the amount of the lanthanide compound used can be varied from about 0.01 to about 2 mmol, in other embodiments from about 0.02 to about 1 mmol, and in other embodiments from about 0.05 to about 0.5 mmol per 100 g of conjugated diene monomer.

In one or more embodiments, the polymerization of conjugated diene monomer according to this invention may be carried out in a polymerization system that includes a substantial amount of solvent. In one embodiment, a solution polymerization system may be employed in which both the monomer to be polymerized and the polymer formed are soluble in the solvent. In another embodiment, a precipitation polymerization system may be employed by choosing a solvent in which the polymer formed is insoluble. In both cases, an amount of solvent in addition to the amount of solvent that may be used in preparing the catalyst is usually added to the polymerization system. The additional solvent may be the same as or different from the solvent used in preparing the catalyst. Exemplary solvents have been set forth above. In one or more embodiments, the solvent content of the polymerization mixture may be more than 20% by weight, in other embodiments more than 50% by weight, and in still other embodiments more than 80% by weight based on the total weight of the polymerization mixture.

In other embodiments, the polymerization system employed may be generally considered a bulk polymerization system that includes substantially no solvent or a minimal amount of solvent. Those skilled in the art will appreciate the benefits of bulk polymerization processes (i.e., processes where monomer acts as the solvent), and therefore the polymerization system includes less solvent than will deleteriously impact the benefits sought by conducting bulk polymerization. In one or more embodiments, the solvent content of the polymerization mixture may be less than about 20% by weight, in other embodiments less than about 10% by weight, and in still other embodiments less than about 5% by weight based on the total weight of the polymerization mixture. In still another embodiment, the polymerization mixture is substantially devoid of solvent, which refers to the absence of that amount of solvent that would otherwise have an appreciable impact on the polymerization process. Polymerization systems that are substantially devoid of solvent may be referred to as including substantially no solvent. In particular embodiments, the polymerization mixture is devoid of solvent.

The polymerization may be conducted in any conventional polymerization vessels known in the art. In one or more embodiments, solution polymerization can be conducted in a conventional stirred-tank reactor. In other embodiments, bulk polymerization can be conducted in a conventional stirred-tank reactor, especially if the monomer conversion is less than about 60%. In still other embodiments, especially where the monomer conversion in a bulk polymerization process is higher than about 60%, which typically results in a highly viscous cement, the bulk polymerization may be conducted in an elongated reactor in which the viscous cement under polymerization is driven to move by piston, or substantially by piston. For example, extruders in which the cement is pushed along by a self-cleaning single-screw or double-screw agitator are suitable for this purpose. Examples of useful bulk polymerization processes are disclosed in U.S. Pat. No. 7,351,776, which is incorporated herein by reference.

In one or more embodiments, all of the ingredients used for the polymerization can be combined within a single vessel (e.g., a conventional stirred-tank reactor), and all steps of the polymerization process can be conducted within this vessel. In other embodiments, two or more of the ingredients can be pre-combined in one vessel and then transferred to another vessel where the polymerization of monomer (or at least a major portion thereof) may be conducted.

The polymerization can be carried out as a batch process, a continuous process, or a semi-continuous process. In the semi-continuous process, the monomer is intermittently charged as needed to replace that monomer already polymerized. In one or more embodiments, the conditions under which the polymerization proceeds may be controlled to maintain the temperature of the polymerization mixture within a range from about −10° C. to about 200° C., in other embodiments from about 0° C. to about 150° C., and in other embodiments from about 20° C. to about 100° C. In one or more embodiments, the heat of polymerization may be removed by external cooling by a thermally controlled reactor jacket, internal cooling by evaporation and condensation of the monomer through the use of a reflux condenser connected to the reactor, or a combination of the two methods. Also, conditions may be controlled to conduct the polymerization under a pressure of from about 0.1 atmosphere to about 50 atmospheres, in other embodiments from about 0.5 atmosphere to about 20 atmosphere, and in other embodiments from about 1 atmosphere to about 10 atmospheres. In one or more embodiments, the pressures at which the polymerization may be carried out include those that ensure that the majority of the monomer is in the liquid phase. In these or other embodiments, the polymerization mixture may be maintained under anaerobic conditions.

The polydienes produced by the polymerization process of this invention may possess pseudo-living characteristics, such that some of polymer chains in these polymers have reactive chain ends. Once a desired monomer conversion is achieved, a functionalizing agent may optionally be introduced into the polymerization mixture to react with any reactive polymer chains so as to give a functionalized polymer. In one or more embodiments, the functionalizing agent is introduced prior to contacting the polymerization mixture with a quenching agent. In other embodiments, the functionalizing may be introduced after the polymerization mixture has been partially quenched with a quenching agent.

In one or more embodiments, functionalizing agents include compounds or reagents that can react with a reactive polymer produced by this invention and thereby provide the polymer with a functional group that is distinct from a propagating chain that has not been reacted with the functionalizing agent. The functional group may be reactive or interactive with other polymer chains (propagating and/or non-propagating) or with other constituents such as reinforcing fillers (e.g., carbon black) that may be combined with the polymer. In one or more embodiments, the reaction between the functionalizing agent and the reactive polymer proceeds via an addition or substitution reaction.

Useful functionalizing agents may include compounds that simply provide a functional group at the end of a polymer chain without joining two or more polymer chains together, as well as compounds that can couple or join two or more polymer chains together via a functional linkage to form a single macromolecule. The latter type of functionalizing agents may also be referred to as coupling agents.

In one or more embodiments, functionalizing agents include compounds that will add or impart a heteroatom to the polymer chain. In particular embodiments, functionalizing agents include those compounds that will impart a functional group to the polymer chain to form a functionalized polymer that reduces the 50° C. hysteresis loss of a carbon-black filled vulcanizates prepared from the functionalized polymer as compared to similar carbon-black filled vulcanizates prepared from non-functionalized polymer. In one or more embodiments, this reduction in hysteresis loss is at least 5%, in other embodiments at least 10%, and in other embodiments at least 15%.

In one or more embodiments, suitable functionalizing agents include those compounds that contain groups that may react with pseudo-living polymers (e.g., those produced in accordance with this invention). Exemplary functionalizing agents include ketones, quinones, aldehydes, amides, esters, isocyanates, isothiocyanates, epoxides, imines, aminoketones, aminothioketones, and acid anhydrides. Examples of these compounds are disclosed in U.S. Pat. Nos. 4,906,706, 4,990,573, 5,064,910, 5,567,784, 5,844,050, 6,838,526, 6,977,281, and 6,992,147; U.S. Pat. Publ. Nos. 2006/0004131 A1, 2006/0025539 A1, 2006/0030677 A1, and 2004/0147694 A1; Japanese Patent Application Nos. 05-051406A, 05-059103A, 10-306113A, and 11-035633A; which are incorporated herein by reference. Other examples of functionalizing agents include azine compounds as described in U.S. Pat. Publ. No. 2007/0149717, hydrobenzamide compounds as disclosed in U.S. Pat. Publ. No. 2007/0276122, nitro compounds as disclosed in U.S. Pat. Publ. No. 2008/0051552, and protected oxime compounds as disclosed in U.S. Pat. Publ. No. 2008/0146745, all of which are incorporated herein by reference.

In particular embodiments, the functionalizing agents employed may be coupling agents which include, but are not limited to, metal halides such as tin tetrachloride, metalloid halides such as silicon tetrachloride, metal ester-carboxylate complexes such as dioctyltin bis(octylmaleate), alkoxysilanes such as tetraethyl orthosilicate, and alkoxystannanes such as tetraethoxytin. Coupling agents can be employed either alone or in combination with other functionalizing agents. The combination of functionalizing agents may be used in any molar ratio.

The amount of functionalizing agent introduced to the polymerization mixture may depend upon various factors including the type and amount of catalyst used to initiate the polymerization, the type of functionalizing agent, the desired level of functionality and many other factors. In one or more embodiments, the amount of functionalizing agent may be in a range of from about 1 to about 200 moles, in other embodiments from about 5 to about 150 moles, and in other embodiments from about 10 to about 100 moles per mole of the lanthanide compound.

Because reactive polymer chains may slowly self-terminate at high temperatures, in one embodiment the functionalizing agent may be added to the polymerization mixture once a peak polymerization temperature is observed. In other embodiments, the functionalizing agent may be added within about 25 to 35 minutes after the peak polymerization temperature is reached.

In one or more embodiments, the functionalizing agent may be introduced to the polymerization mixture after a desired monomer conversion is achieved but before a quenching agent containing a protic hydrogen atom is added. In one or more embodiments, the functionalizing agent is added to the polymerization mixture after a monomer conversion of at least 5%, in other embodiments at least 10%, in other embodiments at least 20%, in other embodiments at least 50%, and in other embodiments at least 80%. In these or other embodiments, the functionalizing agent is added to the polymerization mixture prior to a monomer conversion of 90%, in other embodiments prior to 70% monomer conversion, in other embodiments prior to 50% monomer conversion, in other embodiments prior to 20% monomer conversion, and in other embodiments prior to 15%. In one or more embodiments, the functionalizing agent is added after complete, or substantially complete monomer conversion. In particular embodiments, a functionalizing agent may be introduced to the polymerization mixture immediately prior to, together with, or after the introduction of a Lewis base as disclosed in U.S. Pat. Publ. No. 2009/0043046, which is incorporated herein by reference.

In one or more embodiments, the functionalizing agent may be introduced to the polymerization mixture at a location (e.g., within a vessel) where the polymerization (or at least a portion thereof) has been conducted. In other embodiments, the functionalizing agent may be introduced to the polymerization mixture at a location that is distinct from where the polymerization (or at least a portion thereof) has taken place. For example, the functionalizing agent may be introduced to the polymerization mixture in downstream vessels including downstream reactors or tanks, in-line reactors or mixers, extruders, or devolatilizers.

Once a functionalizing agent has been introduced to the polymerization mixture and a desired reaction time has been provided, a quenching agent can be added to the polymerization mixture in order to inactivate any residual reactive polymer chains and the catalyst or catalyst components. The quenching agent may be a protic compound, which includes, but is not limited to, an alcohol, a carboxylic acid, an inorganic acid, water, or a mixture thereof. In particular embodiments, the quenching agent includes a polyhydroxy compound as disclosed in U.S. Pat. Publ. No. 2009/0043055, which is incorporated herein by reference. An antioxidant such as 2,6-di-t-butyl-4-methylphenol may be added along with, before, or after the addition of the quenching agent. The amount of the antioxidant employed may be in the range of about 0.2% to about 1% by weight of the polymer product. The quenching agent and the antioxidant may be added as neat materials or, if necessary, dissolved in a hydrocarbon solvent or conjugated diene monomer prior to being added to the polymerization mixture.

Once the polymerization mixture has been quenched, the various constituents of the polymerization mixture may be recovered. In one or more embodiments, the unreacted monomer can be recovered from the polymerization mixture. For example, the monomer can be distilled from the polymerization mixture by using techniques known in the art. In one or more embodiments, a devolatilizer may be employed to remove the monomer from the polymerization mixture. Once the monomer has been removed from the polymerization mixture, the monomer may be purified, stored, and/or recycled back to the polymerization process.

The polymer product may be recovered from the polymerization mixture by using techniques known in the art. In one or more embodiments, desolventization and drying techniques may be used. For instance, the polymer can be recovered by passing the polymerization mixture through a heated screw apparatus, such as a desolventizing extruder, in which the volatile substances are removed by evaporation at appropriate temperatures (e.g., about 100° C. to about 170° C.) and under atmospheric or sub-atmospheric pressure. This treatment serves to remove unreacted monomer as well as any low-boiling solvent. Alternatively, the polymer can also be recovered by subjecting the polymerization mixture to steam desolventization, followed by drying the resulting polymer crumbs in a hot air tunnel. The polymer can also be recovered by directly drying the polymerization mixture on a drum dryer.

In one or more embodiments, the polymers of this invention may be cis-1,4-polydienes having a cis-1,4-linkage content that is greater than 60%, in other embodiments greater than 75%, in other embodiments greater than 90%, in other embodiments greater than 95%, in other embodiments greater than 96%, in other embodiments greater than 97%, in other embodiments greater than 98%, and in other embodiments greater than 99%, where the percentages are based upon the number of diene mer units adopting the cis-1,4 linkage versus the total number of diene mer units. Also, these polymers may have a 1,2-linkage content that is less than 7%, in other embodiments less than 5%, in other embodiments less than 2%, and in other embodiments less than 1%, where the percentages are based upon the number of diene mer units adopting the 1,2-linkage versus the total number of diene mer units. The balance of the diene mer units may adopt the trans-1,4-linkage. The cis-1,4-, 1,2-, and trans-1,4-linkage contents can be determined by infrared spectroscopy.

In one or more embodiments, the number average molecular weight ($M_n$) of the cis-1,4-polydiene polymers of this invention may be from about 1,000 to about 1,000,000, in other embodiments from about 5,000 to about 200,000, in other embodiments from about 25,000 to about 150,000, and in other embodiments from about 50,000 to about 120,000, as determined by using gel permeation chromatography (GPC) calibrated with polybutadiene standards and Mark-Houwink constants for the polymer in question. The molecular weight distribution or polydispersity ($M_w/M_n$) of the cis-1,4-polydienes of this invention may be from about 1.5 to about 5.0, and in other embodiments from about 2.0 to about 4.0. In these or other embodiments, the cis-1,4-polydienes of this invention may have a $M_w/M_n$ of less than 3.0, in other embodiments less than 2.5, in other embodiments less than 2.3, in other embodiments less than 2.2, in other embodiments less than 2.1, and in other embodiments less than 2.0.

In one or more embodiments, a functional group may be imparted to the end of the polymer chain possessing a reactive chain end by reacting the reactive polymer with a functionalizing agent. The percentage of polymer chains possessing a functional group may depend on various factors such as the type of catalyst, the type of monomer, the purity of the ingredients, the polymerization temperature, the monomer conversion, and many other factors. In one or more embodiments, at least about 10% of the polymer chains possess a functional end group, in other embodiments at least about 20% of the polymer chains possess a functional end group, in other embodiments at least about 30% of the polymer chains possess a functional end group, in other embodiments at least about 40% of the polymer chains possess a functional end group, in other embodiments at least about 50% of the polymer chains possess a functional end group, in other embodiments at least about 55% of the polymer chains possess a functional end group, and in still other embodiments at least about 60% of the polymer chains possess a functional end group.

Advantageously, the polymers of this invention are particularly useful in preparing rubber compositions that can be used to manufacture tire components. Rubber compounding techniques and the additives employed therein are generally disclosed in *The Compounding and Vulcanization of Rubber*, in Rubber Technology ($2^{nd}$ Ed. 1973).

The rubber compositions can be prepared by using the polymers alone or together with other elastomers (i.e., polymers that can be vulcanized to form compositions possessing rubbery or elastomeric properties). Other elastomers that may be used include natural and synthetic rubbers. The synthetic rubbers typically derive from the polymerization of conjugated diene monomer, the copolymerization of conjugated diene monomer with other monomer such as vinyl-substituted aromatic monomer, or the copolymerization of ethylene with one or more α-olefins and optionally one or more diene monomers.

Exemplary elastomers include natural rubber, synthetic polyisoprene, polybutadiene, polyisobutylene-co-isoprene, neoprene, poly(ethylene-co-propylene), poly(styrene-co-butadiene), poly(styrene-co-isoprene), poly(styrene-co-isoprene-co-butadiene), poly(isoprene-co-butadiene), poly(ethylene-co-propylene-co-diene), polysulfide rubber, acrylic rubber, urethane rubber, silicone rubber, epichlorohydrin rubber, and mixtures thereof. These elastomers can have a myriad of macromolecular structures including linear, branched, and star-shaped structures.

The rubber compositions may include fillers such as inorganic and organic fillers. Examples of organic fillers include carbon black and starch. Examples of inorganic fillers include silica, aluminum hydroxide, magnesium hydroxide, mica, talc (hydrated magnesium silicate), and clays (hydrated aluminum silicates). Carbon blacks and silicas are the most common fillers used in manufacturing tires. In certain embodiments, a mixture of different fillers may be advantageously employed.

In one or more embodiments, carbon blacks include furnace blacks, channel blacks, and lamp blacks. More specific examples of carbon blacks include super abrasion furnace blacks, intermediate super abrasion furnace blacks, high abrasion furnace blacks, fast extrusion furnace blacks, fine furnace blacks, semi-reinforcing furnace blacks, medium processing channel blacks, hard processing channel blacks, conducting channel blacks, and acetylene blacks.

In particular embodiments, the carbon blacks may have a surface area (EMSA) of at least 20 $m^2/g$ and in other embodiments at least 35 $m^2/g$; surface area values can be determined by ASTM D-1765 using the cetyltrimethylammonium bromide (CTAB) technique. The carbon blacks may be in a pelletized form or an unpelletized flocculent form. The preferred form of carbon black may depend upon the type of mixing equipment used to mix the rubber compound.

The amount of carbon black employed in the rubber compositions can be up to about 50 parts by weight per 100 parts by weight of rubber (phr), with about 5 to about 40 phr being typical.

Some commercially available silicas which may be used include Hi-Sil™ 215, Hi-Sil™ 233, and Hi-Sil™ 190 (PPG Industries, Inc.; Pittsburgh, Pa.). Other suppliers of commercially available silica include Grace Davison (Baltimore, Md.), Degussa Corp. (Parsippany, N.J.), Rhodia Silica Systems (Cranbury, N.J.), and J.M. Huber Corp. (Edison, N.J.).

In one or more embodiments, silicas may be characterized by their surface areas, which give a measure of their reinforcing character. The Brunauer, Emmet and Teller ("BET") method (described in *J. Am. Chem. Soc.*, vol. 60, p. 309 et seq.) is a recognized method for determining the surface area. The BET surface area of silica is generally less than 450 $m^2/g$. Useful ranges of surface area include from about 32 to about 400 $m^2/g$, about 100 to about 250 $m^2/g$, and about 150 to about 220 $m^2/g$.

The pH's of the silicas are generally from about 5 to about 7 or slightly over 7, or in other embodiments from about 5.5 to about 6.8.

In one or more embodiments, where silica is employed as a filler (alone or in combination with other fillers), a coupling agent and/or a shielding agent may be added to the rubber compositions during mixing in order to enhance the interaction of silica with the elastomers. Useful coupling agents and shielding agents are disclosed in U.S. Pat. Nos. 3,842,111, 3,873,489, 3,978,103, 3,997,581, 4,002,594, 5,580,919, 5,583,245, 5,663,396, 5,674,932, 5,684,171, 5,684,172 5,696,197, 6,608,145, 6,667,362, 6,579,949, 6,590,017, 6,525,118, 6,342,552, and 6,683,135, which are incorporated herein by reference.

The amount of silica employed in the rubber compositions can be from about 1 to about 100 phr or in other embodiments from about 5 to about 80 phr. The useful upper range is limited by the high viscosity imparted by silicas. When silica is used together with carbon black, the amount of silica can be decreased to as low as about 1 phr; as the amount of silica is decreased, lesser amounts of coupling agents and shielding agents can be employed. Generally, the amounts of coupling agents and shielding agents range from about 4% to about 20% based on the weight of silica used.

A multitude of rubber curing agents (also called vulcanizing agents) may be employed, including sulfur or peroxide-based curing systems. Curing agents are described in Kirk-Othmer, ENCYCLOPEDIA OF CHEMICAL TECHNOLOGY, Vol. 20, pgs. 365-468, ($3^{rd}$ Ed. 1982), particularly *Vulcanization Agents and Auxiliary Materials*, pgs. 390-402, and A. Y. Coran, *Vulcanization*, ENCYCLOPEDIA OF POLYMER SCIENCE AND ENGINEERING, ($2^{nd}$ Ed. 1989), which are incorporated herein by reference. Vulcanizing agents may be used alone or in combination.

Other ingredients that are typically employed in rubber compounding may also be added to the rubber compositions. These include accelerators, accelerator activators, oils, plasticizer, waxes, scorch inhibiting agents, processing aids, zinc oxide, tackifying resins, reinforcing resins, fatty acids such as stearic acid, peptizers, and antidegradants such as antioxidants and antiozonants. In particular embodiments, the oils that are employed include those conventionally used as extender oils, which are described above.

All ingredients of the rubber compositions can be mixed with standard mixing equipment such as Banbury or Brabender mixers, extruders, kneaders, and two-rolled mills. In one or more embodiments, the ingredients are mixed in two or more stages. In the first stage (often referred to as the masterbatch mixing stage), a so-called masterbatch, which typically includes the rubber component and filler, is prepared. To prevent premature vulcanization (also known as scorch), the masterbatch may exclude vulcanizing agents. The masterbatch may be mixed at a starting temperature of from about 25° C. to about 125° C. with a discharge temperature of about 135° C. to about 180° C. Once the masterbatch is prepared, the vulcanizing agents may be introduced and mixed into the masterbatch in a final mixing stage, which is typically conducted at relatively low temperatures so as to reduce the chances of premature vulcanization. Optionally, additional mixing stages, sometimes called remills, can be employed between the masterbatch mixing stage and the final mixing stage. One or more remill stages are often employed where the rubber composition includes silica as the filler. Various ingredients including the polymers of this invention can be added during these remills.

The mixing procedures and conditions particularly applicable to silica-filled tire formulations are described in U.S. Pat. Nos. 5,227,425, 5,719,207, and 5,717,022, as well as European Patent No. 890,606, all of which are incorporated herein by reference. In one embodiment, the initial masterbatch is prepared by including the polymer of this invention and silica in the substantial absence of coupling agents and shielding agents.

The rubber compositions prepared from the polymers of this invention are particularly useful for forming tire components such as treads, subtreads, sidewalls, body ply skims, bead filler, and the like. Preferably, the polymers of this invention are employed in tread and sidewall formulations. In one or more embodiments, these tread or sidewall formulations may include from about 10% to about 100% by weight, in other embodiments from about 35% to about 90% by weight, and in other embodiments from about 50% to about 80% by weight of the polymer based on the total weight of the rubber within the formulation.

Where the rubber compositions are employed in the manufacture of tires, these compositions can be processed into tire components according to ordinary tire manufacturing techniques including standard rubber shaping, molding and curing techniques. Typically, vulcanization is effected by heating the vulcanizable composition in a mold; e.g., it may be heated to about 140° C. to about 180° C. Cured or crosslinked rubber compositions may be referred to as vulcanizates, which generally contain three-dimensional polymeric networks that are thermoset. The other ingredients, such as fillers and processing aids, may be evenly dispersed throughout the crosslinked network. Pneumatic tires can be made as discussed in U.S. Pat. Nos. 5,866,171, 5,876,527, 5,931,211, and 5,971,046, which are incorporated herein by reference.

In order to demonstrate the practice of the present invention, the following examples have been prepared and tested. The examples should not, however, be viewed as limiting the scope of the invention. The claims will serve to define the invention.

EXAMPLES

Catalyst Preparation

To a 200 mL dry bottle purged with nitrogen was added 40.7 g of 20.3% butadiene solution in hexane, 7.7 mL of 0.50 M neodymium versatate, 19.3 mL of neat triisobutylaluminium (3.96 M). After the mixture was stirred for 30 minutes, 5.6 mL of 1.02 M ethylaluminium dichloride in hexane was added. Then the mixture was aged at room temperature to form the preformed catalyst solution. The concentration of Nd of the catalyst solution was 0.041 M.

Examples 1-6. Polymerization of 1,3-Butadiene

To six dry bottles purged with nitrogen was added hexane and 1,3-butadiene blend in hexane, resulting in a 300 g of 15.0% butadiene solution in hexane. To four bottles were charged with 0.65 mL of 1.18 M PhMe$_2$SiOEt solution in hexane, 0.56 mL of 1.37 M Me$_3$SiOCH$_2$Ph solution in hexane, 0.49 mL of 1.56 M Me$_3$SiOPh solution in hexane, and 0.67 mL of 1.18 M Me$_3$SiOEt solution in hexane, respectively. Then 1.88 mL of the preformed catalyst solution (aged for 1 day) was added to every bottle, followed by 0.00 mL, 0.28 mL, 0.28 mL, 0.28 mL, 0.28 mL and 0.28 mL of 1.09 M diisobutylaluminum hydride in hexane, respectively. The bottles were placed into a 80° C. water-bath and after they were tumbled for 30 minutes, 1.2 mL of 1.0 M 4,4'-bis(diethylamino)benzophenone in toluene was added into polymer solutions. The bottles were tumbled in a 80° C. water-bath for another 15 minutes. The resulting polymer cements were quenched with 3 mL of isopropanol containing 2,6-di-tert-butyl-4-methylphenol, coagulated with isopropanol. The resulting polymers were then dried in a drum-dryer at 120° C. and their properties were summarized in Table 1.

TABLE 1

| Examples | 1 | 2 | 3 | 4 | 5 | 6 |
| --- | --- | --- | --- | --- | --- | --- |
| Alkoxysilane | None | None | PhMe$_2$SiOEt | Me$_3$SiOCH$_2$Ph | Me$_3$SiOPh | Me$_3$SiOEt |
| Alkoxysilane: Nd | 0 | 0 | 10 | 10 | 10 | 10 |
| NdV$_3$, mmol/phgm | 0.17 | 0.17 | 0.17 | 0.17 | 0.17 | 0.17 |
| triisobutylaluminium: Nd | 20.0 | 20.0 | 20.0 | 20.0 | 20.0 | 20.0 |
| ethylaluminium dichloride: Nd | 1.5 | 1.5 | 1.5 | 1.5 | 1.5 | 1.5 |
| di-isobutylaluminum hydride: Nd | 0.0 | 4.0 | 4.0 | 4.0 | 4.0 | 4.0 |
| Polymerization temperature, ° C. | 80 | 80 | 80 | 80 | 80 | 80 |
| Polymerization time, min | 30 | 30 | 30 | 30 | 30 | 30 |
| Conversion, % | 99.9% | 91.1% | 35.8% | 51.6% | 97.1% | 83.6% |
| ML1 + 4 @ 100° C. | 79 | 21.5 | 71.8 | 83.5 | 43.8 | 65.5 |
| T$_{80}$ | 4.12 | 1.95 | 3.66 | 3.97 | 2.78 | 3.17 |
| GPC results | | | | | | |
| Mn | 133,747 | 99,913 | 123,215 | 137,171 | 119,055 | 143,059 |
| Mw | 383,653 | 200,411 | 433,759 | 475,937 | 297,499 | 373,364 |
| Mp | 264,191 | 149,761 | 209,665 | 241,046 | 162,635 | 187,750 |
| Mw/Mn | 2.87 | 2.01 | 3.52 | 3.47 | 2.50 | 2.61 |
| Microstructure by FTIR | | | | | | |
| cis-1,4; % | 96.36% | 94.48% | 97.99% | 98.15% | 97.01% | 97.94% |
| trans-1,4; % | 3.00% | 4.86% | 1.32% | 1.10% | 2.33% | 1.41% |
| Vinyl, % | 0.63% | 0.66% | 0.69% | 0.74% | 0.66% | 0.65% |

From all experimental results, it is clear that introducing a hydrocarbyloxysilane into the Nd-based catalyst composition significantly increases cis content of polybutadiene and may also improve modification efficiency.

Various modifications and alterations that do not depart from the scope and spirit of this invention will become apparent to those skilled in the art. This invention is not to be duly limited to the illustrative embodiments set forth herein.

What is claimed is:

1. A method for producing a polydiene, the method comprising a step of:
    polymerizing conjugated diene monomer with a lanthanide-based catalyst system in the presence of a hydrocarbyloxysilane compound,
    where the hydrocarbyloxysilane compound is defined by the formula $Si(OR^1)_x R^2_{4-x}$ where x is an integer from 1 to 4, each R$^1$ is independently a hydrocarbyl group, and each R$^2$ is independently a hydrogen atom, a halogen atom, or a monovalent organic group, or where two or more R$^2$ groups may join to form a polyvalent organic group,
    where the hydrocarbyloxysilane compound does not include an allyl group or a vinyl group.

2. The method of claim 1, where the lanthanide-based catalyst system is a combination of or reaction product of (a) a lanthanide compound, (b) an alkylating agent, and (c) a halogen source.

3. The method of claim 2, where the alkylating agent includes both (i) an organoaluminum compound defined by the formula AlR$_n$X$_{3-n}$, where each R independently is a monovalent organic group that is attached to the aluminum atom via a carbon atom, where each X independently is a hydrogen atom, a halogen atom, a carboxylate group, an alkoxide group, or an aryloxide group, and where n is an integer in the range of from 1 to 3, and (ii) an aluminoxane.

4. A method for producing a polydiene, the method comprising:
    polymerizing conjugated diene monomer with a lanthanide-based catalyst system in the presence of a hydrocarbyloxysilane compound,
    where the hydrocarbyloxysilane compound is selected from trihydrocarbyl hydrocarbyloxy silane, dihydrocarbyl dihydrocarbyloxy silane, and hydrocarbyl trihydrocarbyloxy silane.

5. The method of claim 4, where the hydrocarbyloxysilane compound is a trihydrocarbyl hydrocarbyloxy silane compound selected from trialkyl alkyloxy silane, trialkyl cycloalkyloxy silane, trialkyl aryloxy silane, trialkyl aralkyloxy silane, trialkyl alkaryloxy silane, tricycloalkyl alkyloxy silane, tricycloalkyl cycloalkyloxy silane, tricycloalkyl aryloxy silane, tricycloalkyl aralkyloxy silane, tricycloalkyl alkaryloxy silane, triaryl alkyloxy silane, triaryl cycloalkyloxy silane, triaryl aryloxy silane, triaryl aralkyloxy silane, triaryl alkaryloxy silane, triaralkyl alkyloxy silane, triaralkyl cycloalkyloxy silane, triaralkyl aryloxy silane, triaralkyl aralkyloxy silane, triaralkyl alkaryloxy silane, trialkaryl alkyloxy silane, trialkaryl cycloalkyloxy silane, trialkaryl aryloxy silane, trialkaryl aralkyloxy silane, trialkaryl alkaryloxy silane, dialkyl cycloalkyl alkyloxy silane, dialkyl cycloalkyl cycloalkyloxy silane, dialkyl cycloalkyl aryloxy silane, dialkyl cycloalkyl aralkyloxy silane, dialkyl cycloalkyl alkaryloxy silane, alkyl dicycloalkyl alkyloxy silane, alkyl dicycloalkyl cycloalkyloxy silane, alkyl dicycloalkyl aryloxy silane, alkyl dicycloalkyl aralkyloxy silane, alkyl dicycloalkyl alkaryloxy silane, dialkyl aryl alkyloxy silane, dialkyl aryl cycloalkyloxy silane, dialkyl aryl aryloxy silane, dialkyl aryl aralkyloxy silane, dialkyl aryl alkaryloxy silane, alkyl diaryl alkyloxy silane, alkyl diaryl cycloalkyloxy silane, alkyl diaryl aryloxy silane, alkyl diaryl aralkyloxy silane, alkyl diaryl alkaryloxy silane, alkyl aryl cycloalkyl alkyloxy silane, alkyl aryl cycloalkyl cycloalkyloxy silane, alkyl aryl cycloalkyl aryloxy silane, alkyl aryl cycloalkyl aralkyloxy silane, and alkyl aryl cycloalkyl alkaryloxy silane.

6. The method of claim 4, where the hydrocarbyloxysilane compound is a dihydrocarbyl dihydrocarbyloxy silane compound selected from dialkyl dialkyloxy silane, dialkyl dicycloalkyloxy silane, dialkyl diaryloxy silane, dialkyl diaralkyloxy silane, dialkyl dialkaryloxy silane, dialkyl alkyloxy cycloalkyloxy silane, dialkyl alkyloxy aryloxy silane, dialkyl aryloxy cycloalkyloxy silane, dialkyl dialkyloxy silane, dicycloalkyl dicycloalkyloxy silane, dicycloalkyl diaryloxy silane, dicycloalkyl diaralkyloxy silane, dicycloalkyl dialkaryloxy silane, dicycloalkyl alkyloxy cycloalkyloxy silane, dicycloalkyl alkyloxy aryloxy silane, dicycloalkyl aryloxy cycloalkyloxy silane, diaryl dialkyloxy silane, diaryl dicycloalkyloxy silane, diaryl diaryloxy silane, diaryl diaralkyloxy silane, diaryl dialkaryloxy silane, diaryl alkyloxy cycloalkyloxy silane, diaryl alkyloxy aryloxy silane, diaryl aryloxy cycloalkyloxy silane, diaralkyl dialkyloxy silane, diaralkyl dicycloalkyloxy silane, diaralkyl diaryloxy silane, diaralkyl diaralkyloxy silane, diaralkyl dialkaryloxy silane, diaralkyl alkyloxy cycloalkyloxy silane, diaralkyl alkyloxy aryloxy silane, diaralkyl aryloxy cycloalkyloxy silane, dialkaryl dialkyloxy silane, dialkaryl dicycloalkyloxy silane, dialkaryl diaryloxy silane, dialkaryl diaralkyloxy silane, dialkaryl dialkaryloxy silane, dialkaryl alkyloxy cycloalkyloxy silane, dialkaryl alkyloxy aryloxy silane, dialkaryl aryloxy cycloalkyloxy silane, alkyl cycloalkyl dialkyloxy silane, alkyl cycloalkyl dicycloalkyloxy silane, alkyl cycloalkyl diaryloxy silane, alkyl cycloalkyl diaralkyloxy silane, alkyl cycloalkyl dialkaryloxy silane, alkyl cycloalkyl alkyloxy cycloalkyloxy silane, alkyl cycloalkyl alkyloxy aryloxy silane, alkyl cycloalkyl aryloxy cycloalkyloxy silane, alkyl aryl dialkyloxy silane, alkyl aryl dicycloalkyloxy silane, alkyl aryl diaryloxy silane, alkyl aryl diaralkyloxy silane, alkyl aryl dialkaryloxy silane, alkyl aryl alkyloxy cycloalkyloxy silane, alkyl aryl alkyloxy aryloxy silane, alkyl aryl aryloxy cycloalkyloxy silane, aryl cycloalkyl dialkyloxy silane, aryl cycloalkyl dicycloalkyloxy silane, aryl cycloalkyl diaryloxy silane, aryl cycloalkyl diaralkyloxy silane, aryl cycloalkyl dialkaryloxy silane, aryl cycloalkyl alkyloxy cycloalkyloxy silane, aryl cycloalkyl alkyloxy aryloxy silane, and aryl cycloalkyl aryloxy cycloalkyloxy silane.

7. The method of claim 4, where the hydrocarbyloxysilane compound is a hydrocarbyl trihydrocarbyloxy silane compound selected from alkyl trialkyloxy silane, alkyl tricycloalkyloxy silane, alkyl triaryloxy silane, alkyl triaralkyloxy silane, alkyl trialkaryloxy silane, alkyl dialkyloxy cycloalkyloxy silane, alkyl alkyloxy dicycloalkyloxy silane, alkyl dialkyloxy aryloxy silane, alkyl alkyloxy diaryloxy silane, alkyl alkyloxy aryloxy cycloalkyloxy silane, cycloalkyl trialkyloxy silane, cycloalkyl tricycloalkyloxy silane, cycloalkyl triaryloxy silane, cycloalkyl triaralkyloxy silane, cycloalkyl trialkaryloxy silane, cycloalkyl dialkyloxy cycloalkyloxy silane, cycloalkyl alkyloxy dicycloalkyloxy silane, cycloalkyl dialkyloxy aryloxy silane, cycloalkyl alkyloxy diaryloxy silane, cycloalkyl alkyloxy aryloxy cycloalkyloxy silane, aryl trialkyloxy silane, aryl tricycloalkyloxy silane, aryl triaryloxy silane, aryl triaralkyloxy silane, aryl trialkaryloxy silane, aryl dialkyloxy cycloalkyloxy silane, aryl alkyloxy dicycloalkyloxy silane, aryl dialkyloxy aryloxy silane, aryl alkyloxy diaryloxy silane, aryl alkyloxy aryloxy cycloalkyloxy silane, aralkyl trialkyloxy silane, aralkyl tricycloalkyloxy silane, aralkyl triaryloxy silane, aralkyl triaralkyloxy silane, aralkyl trialkaryloxy silane, aralkyl dialkyloxy cycloalkyloxy silane, aralkyl alkyloxy dicycloalkyloxy silane, aralkyl dialkyloxy aryloxy silane, aralkyl alkyloxy diaryloxy silane, aralkyl alkyloxy aryloxy cycloalkyloxy silane, alkaryl trialkyloxy silane, alkaryl tricycloalkyloxy silane, alkaryl triaryloxy silane, alkaryl triaralkyloxy silane, alkaryl trialkaryloxy silane, alkaryl dialkyloxy cycloalkyloxy silane, alkaryl alkyloxy dicycloalkyloxy silane, alkaryl dialkyloxy aryloxy silane, alkaryl alkyloxy diaryloxy silane, and alkaryl alkyloxy aryloxy cycloalkyloxy silane.

8. The method of claim 4, where the hydrocarbyloxysilane compound is a trihydrocarbyl hydrocarbyloxy silane compound selected from trimethyl methoxy silane, trimethyl ethoxy silane, trimethyl phenoxy silane, triethyl methoxy silane, triethyl ethoxy silane, triethyl phenoxy silane, tri-n-propyl methoxy silane, tri-n-propyl ethoxy silane, tri-n-propyl phenoxy silane, triisopropyl methoxy silane, triisopropyl ethoxy silane, triisopropyl phenoxy silane, tri-n-butyl methoxy silane, tri-n-butyl ethoxy silane, tri-n-butyl phenoxy silane, tri-t-butyl methoxy silane, tri-t-butyl ethoxy silane, tri-t-butyl phenoxy silane, trineopentyl methoxy silane, trineopentyl ethoxy silane, trineopentyl phenoxy silane, tri-n-pentyl methoxy silane, tri-n-pentyl ethoxy silane, tri-n-pentyl phenoxy silane, tri-n-hexyl methoxy silane, tri-n-hexyl ethoxy silane, tri-n-hexyl phenoxy silane, tribenzyl methoxy silane, tribenzyl ethoxy silane, tribenzyl phenoxy silane, tricyclohexyl methoxy silane, tricyclohexyl ethoxy silane, tricyclohexyl phenoxy silane, triphenyl methoxy silane, triphenyl ethoxy silane, triphenyl phenoxy silane, dimethyl ethyl methoxy silane, dimethyl ethyl ethoxy silane, dimethyl ethyl phenoxy silane, dimethyl isopropyl methoxy silane, dimethyl isopropyl ethoxy silane, dimethyl isopropyl phenoxy silane, dimethyl phenyl methoxy silane, dimethyl phenyl ethoxy silane, dimethyl phenyl phenoxy silane, ethyl diphenyl methoxy silane, ethyl diphenyl ethoxy silane, ethyl diphenyl phenoxy silane, isopropyl diphenyl methoxy silane, isopropyl diphenyl ethoxy silane, isopropyl diphenyl phenoxy silane, isopropyl diethyl methoxy silane, isopropyl diethyl ethoxy silane, isopropyl diethyl phenoxy silane, dimethyl cyclohexyl methoxy silane, dimethyl cyclohexyl ethoxy silane, dimethyl cyclohexyl phenoxy silane, diethyl cyclohexyl methoxy silane, diethyl cyclohexyl ethoxy silane, and diethyl cyclohexyl phenoxy silane.

9. The method of claim 4, where the hydrocarbyloxysilane compound is a dihydrocarbyl dihydrocarbyloxy silane compound selected from dimethyl dimethoxy silane, dimethyl diethoxy silane, dimethyl diphenoxy silane, dimethyl methoxy ethoxy silane, dimethyl methoxy phenoxy silane, dimethyl phenoxy ethoxy silane, diethyl dimethoxy silane, diethyl diethoxy silane, diethyl diphenoxy silane, diethyl methoxy ethoxy silane, diethyl methoxy phenoxy silane, diethyl phenoxy ethoxy silane, di-n-propyl dimethoxy silane, di-n-propyl diethoxy silane, di-n-propyl diphenoxy silane, di-n-propyl methoxy ethoxy silane, di-n-propyl methoxy phenoxy silane, di-n-propyl phenoxy ethoxy silane, diisopropyl dimethoxy silane, diisopropyl diethoxy silane, diisopropyl diphenoxy silane, diisopropyl methoxy ethoxy silane, diisopropyl methoxy phenoxy silane, diisopropyl phenoxy ethoxy silane, di-n-butyl dimethoxy silane, di-n-butyl diethoxy silane, di-n-butyl diphenoxy silane, di-n-butyl methoxy ethoxy silane, di-n-butyl methoxy phenoxy silane, di-n-butyl phenoxy ethoxy silane, di-t-butyl dimethoxy silane, di-t-butyl diethoxy silane, di-t-butyl diphenoxy silane, di-t-butyl methoxy ethoxy silane, di-t-butyl methoxy phenoxy silane, di-t-butyl phenoxy ethoxy silane, dineopentyl dimethoxy silane, dineopentyl diethoxy silane, dineopentyl diphenoxy silane, dineopentyl methoxy ethoxy silane, dineopentyl methoxy phenoxy silane, dineopentyl phenoxy ethoxy silane, di-n-pentyl dimethoxy silane, di-n-pentyl diethoxy silane, di-n-pentyl diphenoxy silane, di-n-pentyl methoxy ethoxy silane, di-n-pentyl methoxy phenoxy silane, di-n-pentyl phenoxy ethoxy silane, di-n-hexyl dimethoxy silane, di-n-hexyl diethoxy silane, di-n-hexyl diphenoxy silane, di-n-hexyl methoxy ethoxy silane, di-n-hexyl methoxy phenoxy silane, di-n-hexyl phenoxy ethoxy silane, dibenzyl dimethoxy silane, dibenzyl diethoxy silane, dibenzyl diphenoxy silane, dibenzyl methoxy ethoxy silane, dibenzyl methoxy phenoxy silane, dibenzyl phenoxy ethoxy silane, diphenyl dimethoxy silane, diphenyl diethoxy silane, diphenyl diphenoxy silane, diphenyl methoxy ethoxy silane, diphenyl methoxy phenoxy silane, diphenyl phenoxy ethoxy silane, dicyclohexyl dimethoxy silane, dicyclohexyl diethoxy silane, dicyclohexyl diphenoxy silane, dicyclohexyl methoxy ethoxy silane, dicyclohexyl methoxy phenoxy silane, dicyclohexyl phenoxy ethoxy silane, methyl ethyl dimethoxy silane, methyl ethyl diethoxy silane, methyl ethyl diphenoxy silane, methyl ethyl methoxy ethoxy silane, methyl ethyl methoxy phenoxy silane, methyl ethyl phenoxy ethoxy silane, methyl isopropyl dimethoxy silane, methyl isopropyl diethoxy silane, methyl isopropyl diphenoxy silane, methyl isopropyl methoxy ethoxy silane, methyl isopropyl methoxy phenoxy silane, methyl isopropyl phenoxy ethoxy silane, methyl phenyl dimethoxy silane, methyl phenyl diethoxy silane, methyl phenyl diphenoxy silane, methyl phenyl methoxy ethoxy silane, methyl phenyl methoxy phenoxy silane, methyl phenyl phenoxy ethoxy silane, ethyl phenyl dimethoxy silane, ethyl phenyl diethoxy silane, ethyl phenyl diphenoxy silane, ethyl phenyl methoxy ethoxy silane, ethyl phenyl methoxy phenoxy silane, ethyl phenyl phenoxy ethoxy silane, isopropyl phenyl dimethoxy silane, isopropyl phenyl diethoxy silane, isopropyl phenyl diphenoxy silane, isopropyl phenyl methoxy ethoxy silane, isopropyl phenyl methoxy phenoxy silane, isopropyl phenyl phenoxy ethoxy silane, isopropyl ethyl dimethoxy silane, isopropyl ethyl diethoxy silane, isopropyl ethyl diphenoxy silane, isopropyl ethyl methoxy ethoxy silane, isopropyl ethyl methoxy phenoxy silane, isopropyl ethyl phenoxy ethoxy silane, methyl cyclohexyl dimethoxy silane, methyl cyclohexyl diethoxy silane, methyl cyclohexyl diphenoxy silane, methyl cyclohexyl methoxy ethoxy silane, methyl cyclohexyl methoxy phenoxy silane, methyl cyclohexyl phenoxy ethoxy silane, ethyl cyclohexyl dimethoxy silane, ethyl cyclohexyl diethoxy silane, ethyl cyclohexyl diphenoxy silane, ethyl cyclohexyl methoxy ethoxy silane, ethyl cyclohexyl methoxy phenoxy silane, and ethyl cyclohexyl phenoxy ethoxy silane.

10. The method of claim 4, where the hydrocarbyloxysilane compound is a hydrocarbyl trihydrocarbyloxy silane compound selected from methyl trimethoxy silane, methyl triethoxy silane, methyl triphenoxy silane, methyl dimethoxy ethoxy silane, methyl dimethoxy phenoxy silane, methyl diphenoxy ethoxy silane, methyl methoxy ethoxy phenoxy silane, ethyl trimethoxy silane, ethyl triethoxy silane, ethyl triphenoxy silane, ethyl dimethoxy ethoxy silane, ethyl dimethoxy phenoxy silane, ethyl diphenoxy ethoxy silane, ethyl methoxy ethoxy phenoxy silane, n-propyl trimethoxy silane, n-propyl triethoxy silane, n-propyl triphenoxy silane, n-propyl dimethoxy ethoxy silane, n-propyl dimethoxy phenoxy silane, n-propyl diphenoxy ethoxy silane, n-propyl methoxy ethoxy phenoxy silane, isopropyl trimethoxy silane, isopropyl triethoxy silane, isopropyl triphenoxy silane, isopropyl dimethoxy ethoxy silane, isopropyl dimethoxy phenoxy silane, isopropyl diphenoxy ethoxy silane, isopropyl methoxy ethoxy phenoxy silane, n-butyl trimethoxy silane, n-butyl triethoxy silane, n-butyl triphenoxy silane, n-butyl dimethoxy ethoxy silane, n-butyl dimethoxy phenoxy silane, n-butyl diphenoxy ethoxy silane, n-butyl methoxy ethoxy phenoxy silane, t-butyl trimethoxy silane, t-butyl triethoxy silane, t-butyl triphenoxy silane, t-butyl dimethoxy ethoxy silane, t-butyl dimethoxy phenoxy silane, t-butyl diphenoxy ethoxy silane, t-butyl methoxy ethoxy phenoxy silane, neopentyl trimethoxy silane, neopentyl triethoxy silane, neopentyl triphenoxy silane, neopentyl dimethoxy ethoxy silane, neopentyl dimethoxy phenoxy silane, neopentyl diphenoxy ethoxy silane, neopentyl methoxy ethoxy phenoxy silane, n-pentyl trimethoxy silane, n-pentyl triethoxy silane, n-pentyl triphenoxy silane, n-pentyl dimethoxy ethoxy silane, n-pentyl dimethoxy phenoxy silane, n-pentyl diphenoxy ethoxy silane, n-pentyl methoxy ethoxy phenoxy silane, n-hexyl trimethoxy silane, n-hexyl triethoxy silane, n-hexyl triphenoxy silane, n-hexyl dimethoxy ethoxy silane, n-hexyl dimethoxy phenoxy silane, n-hexyl diphenoxy ethoxy silane, n-hexyl methoxy ethoxy phenoxy silane, benzyl trimethoxy silane, benzyl triethoxy silane, benzyl triphenoxy silane, benzyl dimethoxy ethoxy silane, benzyl dimethoxy phenoxy silane, benzyl diphenoxy ethoxy silane, benzyl methoxy ethoxy phenoxy silane, phenyl trimethoxy silane, phenyl triethoxy silane, phenyl triphenoxy silane, phenyl dimethoxy ethoxy silane, phenyl dimethoxy phenoxy silane, phenyl diphenoxy ethoxy silane, phenyl methoxy ethoxy phenoxy silane, cyclohexyl trimethoxy silane, cyclohexyl triethoxy silane, cyclohexyl triphenoxy silane, cyclohexyl dimethoxy ethoxy silane, cyclohexyl dimethoxy phenoxy silane, cyclohexyl diphenoxy ethoxy silane, and cyclohexyl methoxy ethoxy phenoxy silane.

11. A method for producing a polydiene, the method comprising the steps of:
 (i) forming an active catalyst by combining a lanthanide-containing compound, an alkylating agent, and a halogen source; and
 (ii) polymerizing conjugated diene monomer in the presence of the active catalyst and a hydrocarbyloxysilane compound,
 where the hydrocarbyloxysilane compound does not include an allyl group or a vinyl group.

12. The method of claim 11, where the active catalyst is preformed.

13. The method of claim 11, where said step of polymerizing takes place within a polymerization mixture including less than 20% by weight of organic solvent based upon the total weight of the polymerization mixture.

14. The method of claim 11, where said step of polymerizing produces a polydiene having a reactive chain end, and further comprising the step of reacting a functionalizing agent with the reactive chain end.

15. The method of claim 11, further comprising a step of introducing the hydrocarbyloxysilane compound to the active catalyst prior to said step of polymerizing.

16. The method of claim 11, further comprising a step of directly and individually introducing the hydrocarbyloxysilane compound to the conjugated diene monomer.

17. The method of claim 16, where the hydrocarbyloxysilane compound is introduced to the conjugated diene monomer before 5% of the monomer is polymerized.

18. The method of claim 12, where the active catalyst is preformed in the presence of monomer.

* * * * *